United States Patent
Prabhu et al.

(10) Patent No.: US 10,817,534 B2
(45) Date of Patent: *Oct. 27, 2020

(54) SYSTEMS AND METHODS FOR INTEREST-DRIVEN DATA VISUALIZATION SYSTEMS UTILIZING VISUALIZATION IMAGE DATA AND TRELLISED VISUALIZATIONS

(71) Applicant: Workday, Inc., Pleasanton, CA (US)

(72) Inventors: Prithvi Prabhu, Sunnyvale, CA (US); James Mulholland, San Francisco, CA (US); Hans-Frederick Brown, San Rafael, CA (US); Benjamin Mark Werther, Burlingame, CA (US); Kevin Scott Beyer, San Francisco, CA (US); John Glenn Eshleman, Mountain View, CA (US)

(73) Assignee: Workday, Inc., Pleasanton, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/904,187

(22) Filed: Feb. 23, 2018

(65) Prior Publication Data

US 2019/0005104 A1    Jan. 3, 2019

Related U.S. Application Data

(63) Continuation of application No. 14/140,211, filed on Dec. 24, 2013, now Pat. No. 9,934,299.
(Continued)

(51) Int. Cl.
*G06F 16/26* (2019.01)
*G06Q 10/10* (2012.01)
(Continued)

(52) U.S. Cl.
CPC .............. *G06F 16/26* (2019.01); *G06Q 10/06* (2013.01); *G06Q 10/10* (2013.01); *G06Q 30/02* (2013.01)

(58) Field of Classification Search
CPC ........ G06F 16/26; G06Q 10/06; G06Q 10/10; G06Q 30/02
(Continued)

(56) References Cited

U.S. PATENT DOCUMENTS 6,112,197 A    8/2000  Chatterjee
6,349,138 B1   2/2002  Doshi
(Continued)

FOREIGN PATENT DOCUMENTS

EP       2040180 A1      3/2009
WO    WO-2007072501 A2   6/2007
(Continued)

OTHER PUBLICATIONS

Borthakur et al., 'Apache Hadoop Goes Realtime at Facebook', SIGMOD '11 Proceedings of the 2011 ACM SIGMOD International Conference on Management of data, 1071-1080.
(Continued)

*Primary Examiner* — Usmaan Saeed
*Assistant Examiner* — Jessica N Le
(74) *Attorney, Agent, or Firm* — Van Pelt, Yi & James LLP

(57) ABSTRACT

Systems and methods for interest-driven data visualization systems are illustrated. The system includes a processor and a memory configured to store an interest-driven data visualization application. The application configures the processor to obtain reporting data including a plurality of datasets from an interest-driven business intelligence server system; generate visualization rendering data for the datasets based on associations between visualization metadata and the
(Continued)

datasets; and generate visualization image data based on the visualization rendering data. The visualization image data is displayable using and includes visual representations of at least a portion of the reporting data. Pieces of the visualization image data correspond to master and slave visualizations. The slave visualization is related to the master visualization such that input data associated with the master visualization is mapped to the slave visualization and at least one piece of input data associated with the slave visualization is not mapped to the master visualization.

14 Claims, 18 Drawing Sheets

Related U.S. Application Data

(60) Provisional application No. 61/894,388, filed on Oct. 22, 2013.

(51) Int. Cl.
*G06Q 30/02* (2012.01)
*G06Q 10/06* (2012.01)

(58) Field of Classification Search
USPC .......................................................... 707/722
See application file for complete search history.

(56) References Cited

U.S. PATENT DOCUMENTS

| | | | |
|---|---|---|---|
| 6,707,454 B1* | 3/2004 | Barg | G06F 17/246 |
| | | | 345/440 |
| 7,009,609 B2 | 3/2006 | Miyadai | |
| 7,151,438 B1 | 12/2006 | Hall | |
| 7,168,953 B1 | 1/2007 | Poggio | |
| 7,209,923 B1 | 4/2007 | Cooper | |
| 7,272,660 B1 | 9/2007 | Powers | |
| 7,275,053 B1 | 9/2007 | Gardner | |
| 7,293,031 B1 | 11/2007 | Dusker | |
| 7,315,849 B2 | 1/2008 | Bakalash | |
| 7,430,562 B1 | 9/2008 | Bedell | |
| 7,702,615 B1 | 4/2010 | Delurgio | |
| 7,716,173 B2* | 5/2010 | Stolte | G06F 17/246 |
| | | | 707/600 |
| 7,945,852 B1 | 5/2011 | Pilskalns | |
| 8,032,485 B2 | 10/2011 | Alvarez | |
| 8,099,674 B2 | 1/2012 | Mackinlay | |
| 8,156,101 B2 | 4/2012 | Indeck | |
| 8,260,840 B1 | 9/2012 | Sirota | |
| 8,261,193 B1 | 9/2012 | Alur | |
| 8,266,148 B2 | 9/2012 | Guha | |
| 8,447,721 B2 | 5/2013 | Eshleman | |
| 9,824,127 B2* | 11/2017 | Prabhu | G06F 16/248 |
| 9,934,299 B2* | 4/2018 | Prabhu | G06Q 10/06 |
| 2003/0030733 A1 | 2/2003 | Seaman | |
| 2004/0059701 A1 | 3/2004 | Fedorov | |
| 2004/0164961 A1 | 8/2004 | Bal | |
| 2005/0187974 A1 | 8/2005 | Gong | |
| 2007/0021992 A1 | 1/2007 | Konakalla | |
| 2007/0078960 A1 | 4/2007 | Dawson | |
| 2007/0136683 A1 | 6/2007 | Heidari | |
| 2007/0156718 A1 | 7/2007 | Hossfeld | |
| 2007/0180168 A1 | 8/2007 | Chikusa | |
| 2008/0036767 A1 | 2/2008 | Janzen | |
| 2008/0109235 A1 | 5/2008 | Binnie | |
| 2008/0288889 A1 | 11/2008 | Hunt | |
| 2008/0294996 A1 | 11/2008 | Hunt | |
| 2008/0313345 A1 | 12/2008 | Bernardin | |
| 2009/0006319 A1 | 1/2009 | Lehtipalo | |
| 2009/0248631 A1 | 10/2009 | Alba | |
| 2010/0100952 A1 | 4/2010 | Sample | |
| 2010/0251100 A1 | 9/2010 | Delacourt | |
| 2010/0287146 A1 | 11/2010 | Skelton | |
| 2011/0004830 A1 | 1/2011 | Von Kaenel | |
| 2011/0137850 A1* | 6/2011 | Mourey | G06Q 10/00 |
| | | | 706/54 |
| 2011/0145287 A1 | 6/2011 | Jiang | |
| 2011/0282690 A1 | 11/2011 | Patel | |
| 2011/0313969 A1 | 12/2011 | Ramu | |
| 2012/0130987 A1 | 5/2012 | Bose | |
| 2012/0169713 A1 | 7/2012 | Gao | |
| 2012/0179742 A1 | 7/2012 | Acharya | |
| 2012/0310875 A1 | 12/2012 | Prahlad | |
| 2013/0013552 A1 | 1/2013 | Eshleman | |
| 2013/0018671 A1 | 1/2013 | Hussam | |
| 2013/0086104 A1 | 4/2013 | Morrison | |
| 2013/0103677 A1 | 4/2013 | Chakra | |
| 2013/0136416 A1 | 5/2013 | Sathish | |
| 2013/0226860 A1 | 8/2013 | Eshleman | |
| 2013/0238551 A1 | 9/2013 | Eshleman | |
| 2013/0268520 A1 | 10/2013 | Fisher | |
| 2013/0297050 A1 | 11/2013 | Reichard | |
| 2014/0114909 A1 | 4/2014 | Schuster | |
| 2014/0114970 A1 | 4/2014 | Prabu | |
| 2014/0258209 A1 | 9/2014 | Eshleman | |
| 2015/0081353 A1 | 3/2015 | Schuster | |
| 2015/0081618 A1 | 3/2015 | Schuster | |
| 2015/0081619 A1 | 3/2015 | Brown | |

FOREIGN PATENT DOCUMENTS

| | | |
|---|---|---|
| WO | WO-2008092149 A2 | 7/2008 |
| WO | WO-2013130870 A1 | 9/2013 |
| WO | WO-2014066051 A2 | 5/2014 |
| WO | WO-2014066052 A2 | 5/2014 |
| WO | WO-201413741 A1 | 9/2014 |
| WO | WO-2015041714 A1 | 3/2015 |
| WO | WO-2015041731 A1 | 3/2015 |
| WO | WO-2015041735 A1 | 3/2015 |
| WO | WO-2015060892 A1 | 4/2015 |
| WO | WO-2015060893 A1 | 4/2015 |

OTHER PUBLICATIONS

Cohen, Jeffrey et al., 'MAD Skills: New Analysis Practices for Big Data', Proceedings of the VLDB Endowment, vol. 2 Issue 2, Aug. 2009, 1481-1492.

Condie, Tyson et al., 'MapReduce Online', Nsdi. vol. 10. No. 4. 2010. Available online at http://www.eecs.berkeley.edu/Pubs/TechRpts/2009/EECS-2009-136.html, 1-15.

Extended European Search Report for European Application EP13754225.4,Report Completed May 4, 2015, dated May 13, 2015, 4 Pgs.

International Preliminary Report on Patentability for International Application PCT/US2013/028402, report completed Apr. 23, 2013, dated Sep 12, 2014, 6 Pgs., Sep. 12, 2014.

International Preliminary Report on Patentability for International Application PCT/US2013/064271, Report Issued Apr. 28, 2015, dated May 7, 2015, 9 Pgs.

International Preliminary Report on Patentability for International Application PCT/US2013/064272, Report Issued Apr. 28, 2015, dated May 7, 2015, 5 Pgs.

International Preliminary Report on Patentability for International Application PCT/US2013/067815, Report Issued Sep. 8, 2015, dated Sep. 17,2015, 9 Pgs.

International Preliminary Report on Patentability for International Application PCT/US2014/022060, Report issued Mar. 22, 2016, dated Mar. 31, 2016, 8 Pgs.

International Preliminary Report on Patentability for International Application PCT/US2014/029149, Report issued Apr. 26, 2016, dated May 6, 2016, 9 Pgs.

International Preliminary Report on Patentability for International Application PCT/US2014/029191, Report issued Apr. 26, 2016, dated May 6, 2016, 9 Pgs.

International Preliminary Report on Patentability for International Application PCT/US2014/042488, Report issued Mar. 22, 2016, dated Mar. 31, 2016, 8 Pgs.

(56) References Cited

OTHER PUBLICATIONS

International Preliminary Report on Patentability for International Application PCT/US2014/044050, Report issued Mar. 22, 2016, dated Mar. 31, 2016, 6 Pgs.
International Search Report and Written Opinion for International Application PCT/US13/64271, report completed Mar. 26, 2014, dated Apr. 18, 2014, 10 Pgs.
International Search Report and Written Opinion for International Application PCT/US13/64272, report completed Mar. 28, 2014, dated Apr. 21, 2014, 6 Pgs.
International Search Report and Written Opinion for International Application PCT/US14/22060, report completed Jun. 23, 2014 dated Jul. 21, 2014, 9 Pgs.
International Search Report and Written Opinion for International Application PCT/US14/29149, report completed Jul. 22, 2014, dated Aug. 25, 2014, 9 Pages.
International Search Report and Written Opinion for International Application PCT/US14/29191, report completed Jun. 30, 2014, dated Aug. 15, 2014, 9 Pages.
International Search Report and Written Opinion for International Application PCT/US14/42488, report completed Sep. 25, 2014, dated Oct 30, 2014, 9 Pgs., Oct. 30, 2014.
International Search Report and Written Opinion for International Application PCT/US14/44050, report completed Oct. 3, 2014, dated Oct. 15, 2014, 7 Pgs., Oct. 15, 2014.
International Search Report and Written Opinion for International Application PCT/US2013/028402, completed Apr. 22, 2013, 7 pgs.
International Search Report and Written Opinion for International Application PCT/US2013/067815, completed Apr. 14, 2014, 11 pgs.
International Search Report and Written Opinion for International Application PCT/US2014/027875, report completed Jul. 15, 2014, dated Aug. 19, 2014, 9 Pages.
Karabegovic, Almir et al., 'Geoportal as Decision Support System with Spatial Data Warehouse', [online] published 2012. [retrieved on Oct. 3, 2014 (Oct. 3, 2014)] Retrieved from the Internet<URL: https://fedcsis.org/proceedings/2012/pliks/111.pdf> entire document, 2012, 4 Pages.
Kossmann, Donald , 'The State of the Art in Distributed Query Processing', ACM Computing Surveys, vol. 32 Issue 4, Dec. 2000, Dec. 2000, 422-469.
Metwally, Ahmed et al., "Efficient computation of frequent and top-k elements in data streams." International Conference on Database Theory. Springer, Berlin, Heidelberg, 2005.
Morfonios, Konstantinos et al., 'ROLAP Implementations of the Data Cube', ACM Computing Surveys, vol. 39, No. 4, Article 12, 2007, Oct. 2007, 12:1-12:53.
Nandi, Arnab et al., 'Guided Interaction: Rethinking the Query-Result Paradigm', Proceedings of the VLDB Endowment, vol. 4, No. 12, Aug. 2011, 1466-1469.
Shvachko et al., 'The Hadoop Distributed File System', 2010 IEEE 26th Symposium on Mass Storage Systems and Technologies (MSST), 1-10.

* cited by examiner

SYSTEMS AND METHODS FOR INTEREST-DRIVEN DATA VISUALIZATION SYSTEMS UTILIZING VISUALIZATION IMAGE DATA AND TRELLISED VISUALIZATIONS

CROSS-REFERENCE TO RELATED APPLICATIONS

This application is a continuation of co-pending U.S. application Ser. No. 14/140,211, entitled SYSTEMS AND METHODS FOR INTEREST-DRIVEN DATA VISUALIZATION SYSTEMS UTILIZING VISUALIZATION IMAGE DATA AND TRELLISED VISUALIZATIONS, filed Dec. 24, 2013, which claims priority to U.S. Provisional Patent Application No. 61/894,388, entitled SYSTEMS AND METHODS FOR INTEREST-DRIVEN DATA VISUALIZATION SYSTEMS UTILIZING VISUALIZATION IMAGE DATA AND TRELLISED VISUALIZATIONS, filed Oct. 22, 2013, both of which are incorporated herein by reference for all purposes.

FIELD OF THE INVENTION

The present invention relates to data visualization systems, and more specifically to interest-driven data visualization systems utilized in interest-driven business intelligence systems.

BACKGROUND

The term "business intelligence" is commonly used to refer to techniques for identifying, processing, and analyzing business data. Business intelligence systems can provide historical, current, and predictive views of business operations. Business data, generated during the course of business operations, including data generated from business processes and the additional data created by employees and customers, can be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and utilize a data warehouse.

Data warehouses are utilized to store, analyze, and report data such as business data. Data warehouses utilize databases to store, analyze, and harness the data in a productive and cost-effective manner. A variety of databases are commonly utilized including a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators, and the underlying database can be tuned for the expected access patterns. A database administrator can index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema that looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP can refer to a variety of transactions such a database management system transactions, business, or commercial transactions. OLTP systems typically have low latency response to user requests.

Online analytical processing (OLAP), a modification of OLTP, is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for any OLAP system is an OLAP cube. An OLAP cube is a data structure allowing for fast analysis of data with the capability of manipulating and analyzing data from multiple perspectives. OLAP cubes typically are composed of numeric facts, called measures, categorized by dimensions. These facts and measures are commonly created from a star schema or a snowflake schema of tables in a RDBMS.

SUMMARY OF THE INVENTION

Systems and methods for interest-driven data visualization systems in accordance with embodiments of the invention are illustrated. In one embodiment, an interest-driven data visualization system includes a processor and a memory connected to the processor and configured to store an interest-driven data visualization application, wherein the interest-driven data visualization application configures the processor to define reporting data requirements, where the reporting data requirements include at least one piece of reporting data metadata, generate data retrieval job data based on the at least one piece of reporting data metadata in the reporting data requirements and the data description metadata, transmit the data retrieval job data to an interest-driven business intelligence server system, receive aggregate data from the interest-driven business intelligence server system, create at least one piece of reporting data using the received aggregate data, the data description metadata, and the reporting data metadata, generate a report using the at least one piece of reporting data, the reporting data requirements, and the visualization metadata, and generate visualization image data based on the generated report, where the visualization image data is configured to be displayed using a display device and comprises visual representations of portions of the reporting data.

In another embodiment of the invention, the interest-driven data visualization system further includes a display device connected to the processor and the interest-driven data visualization application further configures the processor to display the generated visualization image data using the display device.

In an additional embodiment of the invention, the interest-driven data visualization application further configures the processor to generate visualization image data by associating visualization metadata with the reporting data, where the visualization metadata describes at least one graphical primitive associated with at least one piece of reporting data, generating visualization rendering data based on the associations between the visualization metadata and the reporting data, and rendering the visualization image data using the visualization rendering data and the reporting data.

In yet another additional embodiment of the invention, the interest-driven data visualization application further configures the processor to generate visualization image data by selecting a subset of the pieces of reporting data and generating the visualization rendering data based on the selected subset of the pieces of reporting data.

In still another additional embodiment of the invention, the interest-driven data visualization system further comprises an input device connected to the processor and configured to obtain input data and the subset of the pieces of reporting data is selected based on the input data.

In yet still another additional embodiment of the invention, the interest-driven data visualization application further configures the processor to generate visualization image data by obtaining a second piece of input data using the input device, selecting a second subset of the pieces of reporting data based on the second piece of input data, generating updated visualization rendering data based on the second subset of pieces of reporting data, and rendering updated visualization image data based on the updated visualization rendering data.

In yet another embodiment of the invention, the interest-driven data visualization further configures the processor to obtain the generated image visualization metadata from an interest-driven business intelligence server system.

In still another embodiment of the invention, the interest-driven data visualization application configures the processor to receive aggregate data metadata from the interest-driven business intelligence server system, where the aggregate data metadata includes time estimation data describing the delay associated with generating supplemental aggregate data using source data generated based on time taken to generate at least a portion of the aggregated data.

In yet still another embodiment of the invention, the interest-driven data visualization application configures the processor to generate supplemental data retrieval job data based on the data retrieval job data and the received aggregate data, transmit the supplemental data retrieval job data to the interest-driven business intelligence server system, receive supplemental aggregate data from the interest-driven business intelligence server system, update at least one piece of the at least one piece of reporting data using the supplemental aggregate data, the data description metadata, and the reporting data metadata, and generate updated visualization image data based on the updated reporting data.

In yet another additional embodiment of the invention, the interest-driven data visualization application configures the processor to capture a visualization snapshot using the generated report, where the visualization snapshot includes a portion of the reporting data, the reporting data requirements, and the display data metadata and store the visualization snapshot within the memory.

In still another additional embodiment of the invention, the interest-driven data visualization application further configures the processor to transmit the visualization snapshot to a remote system separate from the interest-driven data visualization system, where the remote system is configured to display the visualization snapshot without communicating with the interest-driven business intelligence server system.

In yet still another additional embodiment of the invention, the interest-driven data visualization application further configures the processor to identify a set of datasets within the reporting data, associate visualization metadata with each of the datasets in the set of datasets, where the visualization metadata describes at least one graphical primitive associated with at least one piece of reporting data, generate visualization rendering data for the set of datasets based on the associations between the visualization metadata and the datasets, and render visualization image data for each of the datasets in the set of datasets based on the visualization rendering data and the corresponding dataset.

In yet another embodiment of the invention, the interest-driven data visualization application further configures the processor to create a trellised visualization utilizing the visualization image data for each of the datasets.

In still another embodiment of the invention, the interest-driven data visualization application further configures the processor to obtain input data, where the input data describes an interaction with one piece of visualization image data for one of the datasets in the set of datasets and render updated visualization image data for the piece of visualization image data based on the obtained input data.

In yet still another embodiment of the invention, the interest-driven data visualization application further configures the processor to identify at least one of the pieces of visualization image data as a master visualization.

In yet another additional embodiment of the invention, the interest-driven data visualization application further configures the processor to identify a relationship between at least one of the pieces of visualization image data and the master visualization, where the at least one piece of visualization data is a slave visualization.

In still another additional embodiment of the invention, the interest-driven data visualization application further configures the processor to obtain input data, where the input data describes an interaction with at least one master visualization, render updated master visualization image data for the master visualization based on the obtained input data, where the updated master visualization image data corresponds to the master visualization associated with the input data, map the input data to the slave visualizations sharing a relationship with the master visualization, and render updated slave visualization image data for at least one of the slave visualizations, where the slave visualizations comprise a relationship with the master visualization.

In yet still another additional embodiment of the invention, the interest-driven data visualization application further configures the processor to obtain input data, where the input data identifies an updated dataset to be associated with a piece of visualization image data, where the updated dataset is separate from the dataset currently associated with the piece of visualization image data and render updated visualization image data for the piece of visualization image data based on the obtained input data, where the updated data visualization data includes the updated dataset.

In yet another embodiment of the invention, the updated dataset is associated with a second piece of reporting data separate from the piece of reporting data associated with the dataset originally associated with the piece of visualization image data.

In still another embodiment of the invention, the interest-driven business intelligence server system is configured to process data retrieval job data to generate aggregate data using raw data, where a portion of the raw data is unstructured data, and store aggregate data and the raw data described by the data description metadata.

Yet another embodiment of the invention includes a method for visualizing reporting data including defining reporting data requirements using an interest-driven data visualization system, where the reporting data requirements comprise at least one piece of reporting data metadata, generating data retrieval job data based on the at least one piece of reporting data metadata in the reporting data requirements and the data description metadata using the interest-driven data visualization system, transmitting the data retrieval job data to an interest-driven business intelligence server system using the interest-driven data visualization system, receiving aggregate data from the interest-driven business intelligence server system using the interest-driven data visualization system, creating at least one piece of reporting data based on the received aggregate data, the data description metadata, and the reporting data metadata using the interest-driven data visualization system, generating a report based on the at least one piece of reporting data, the reporting data requirements, and the visualization metadata using the interest-driven data visualization system, and generating visualization image data based on the generated report using the interest-driven data visualization system, where the visualization image data is configured to be displayed using a display device.

Still another embodiment of the invention includes an interest-driven data visualization system including a processor and a memory connected to the processor and configured to store an interest-driven data visualization application, wherein the interest-driven data visualization application configures the processor to define reporting data requirements, where the reporting data requirements comprise at least one piece of reporting data metadata, generate data retrieval job data based on the at least one piece of reporting data metadata in the reporting data requirements and the data description metadata, transmit the data retrieval job data to an interest-driven business intelligence server system, receive aggregate data from the interest-driven business intelligence server system, where the interest-driven business intelligence server system is configured to process data retrieval job data to generate aggregate data using raw data, where a portion of the raw data is unstructured data and store aggregate data and the raw data described by the data description metadata within a metadata storage device, create at least one piece of reporting data using the received aggregate data, the data description metadata, and the reporting data metadata, identify a set of datasets within the reporting data, generate a report based on the set of datasets, the reporting data requirements, and the visualization metadata, generate visualization image data based on the generated report by associating visualization metadata with each of the datasets in the set of datasets, where the visualization metadata describes at least one graphical primitive associated with at least one piece of reporting data, generate visualization rendering data for the set of datasets based on the associations between the visualization metadata and the datasets, and render visualization image data for each of the datasets in the set of datasets based on the visualization rendering data and the corresponding dataset, create a trellised visualization utilizing the visualization image data for each of the datasets, obtain input data, where the input data describes an interaction with one piece of visualization image data for one of the datasets in the set of datasets, generate updated visualization image data for the piece of visualization image data based on the obtained input data, and update the trellised visualization based on the updated visualization image data.

DETAILED DISCLOSURE OF THE INVENTION

Figure 1:
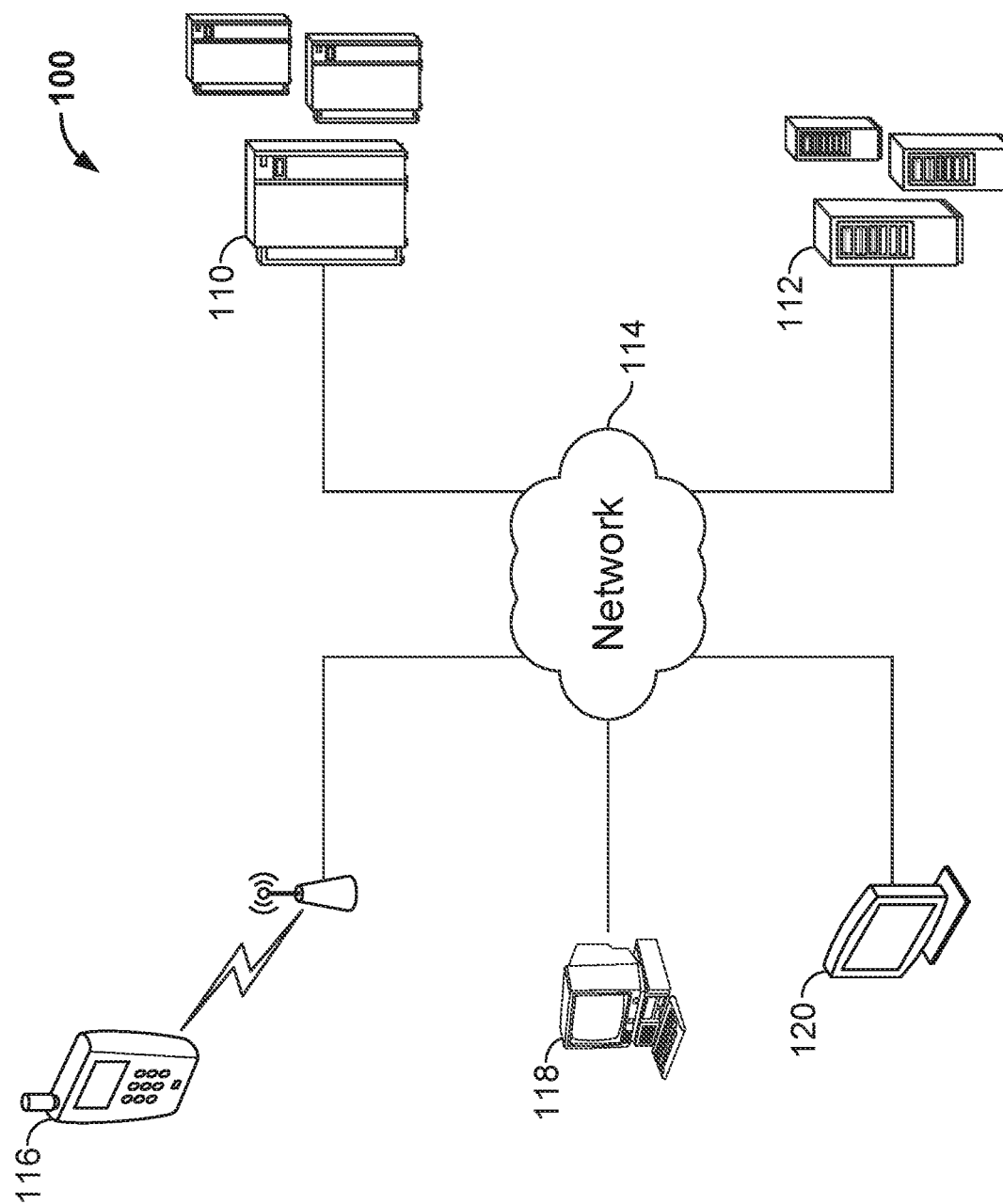
FIG. 1 is a network diagram of a business intelligence system including interest-driven data visualization systems in accordance with an embodiment of the invention.

Turning now to the drawings, systems and methods for interest-driven data visualization systems in accordance with embodiments of the invention are illustrated. Within interest-driven business intelligence systems, interest-driven data visualization systems enable analysts using a variety of systems, including, but not limited to, interest-driven business intelligence systems, to rapidly generate reports using data retrieved and held in-memory by interest-driven business intelligence systems and, at the same time, have the ability to drill down into the underlying raw data to dynamically create new reports. Interest-driven business intelligence systems include interest-driven business intelligence server systems configured to create reporting data using raw data retrieved from distributed computing platforms. The interest-driven business intelligence server systems are configured to dynamically compile interest-driven data pipelines to provide analysts with information of interest from the distributed computing platform. The interest-driven business intelligence server system has the ability to dynamically reconfigure the interest-driven data pipeline to provide access to desired information stored in the distributed computing platform. An interest-driven data pipeline is dynamically compiled to create reporting data based on reporting data requirements determined by analysts interacting with the interest-driven business intelligence system. Changes specified at the report level can be automatically compiled and traced backward by the interest-driven business intelligence server system to compile an appropriate interest-driven data pipeline to meet the new and/or updated reporting data requirements. Interest-driven business intelligence server systems further build metadata concerning the data available in the interest-driven business intelligence system and provide the metadata to the interest-driven data visualization systems to enable the construction of reports using the metadata. In this way, interest-driven business intelligence server systems are capable of managing huge datasets in a way that provides analysts with complete visibility into the available data. Interest-driven business intelligence systems and interest-driven business intelligence server systems that can be utilized in accordance with embodiments of the invention are discussed further in U.S. Pat. No. 8,447,721, titled "Interest-Driven Business Intelligence Systems and Methods of Data Analysis Using Interest-Driven Data Pipelines" and filed Feb. 29, 2012, the entirety of which is incorporated herein by reference.

New reports and visualizations of those reports can utilize reporting data already provided by the interest-driven business intelligence server system and/or cause new reporting data to be generated by the interest-driven business intelligence server system to populate the report. Reporting data provided by interest-driven business intelligence server systems includes raw data loaded from raw data storage obtained from a distributed computing platform that has been processed and loaded into a data structure to provide rapid access to the data. Raw data includes, but is not limited to, structured data, semi-structured data, and unstructured data and can be stored in one or more data sources associated with the interest-driven business intelligence system. In a variety of embodiments, structured and semi-structured data includes metadata, such as an index or other relationships, describing the data; unstructured data lacks any definitional structure. In several embodiments the processing of raw data includes, but is not limited to, aggregating the raw data and filtering the raw data. Business intelligence systems load raw data into a variety of data structures in accordance with a number of embodiments, including, but not limited to, online analytical processing (OLAP) cubes. In many embodiments, visualizations are the viewable representations of reporting data present in an interest-driven data visualization system.

Visualizations can take many forms, such as pie charts, bar charts, column charts, tables, or any other form, which enables the viewing of data contained in the report. In a variety of embodiments, visualizations are multi-dimensional and allow for multiple simultaneous displays, such as via layering and/or compositing different visualizations for different pieces of reporting data, using the reporting data associated with the visualization. One variety of composite visualization is a trellised visualization; techniques for trellised visualizations are described below. The visualization itself is independent of the reporting data it operates on, allowing the analysis to be created on the fly for different pieces of reporting data. Rendering of visualizations is accomplished by associating the pieces of reporting data with graphical primitives and combining the graphical primitives to form a composite rendering of the visualization. The composite rendering takes into account the nature and attributes of the pieces of reporting data, enabling pieces of reporting data from disparate sources to be interpreted correctly by analyzing the visualization. The reports and/or the visualizations are configured to be displayed using display devices in several embodiments of the invention.

In a variety of embodiments, visualizations are generated utilizing visualization rendering data. The visualization rendering data includes metadata describing the relationships between subsets of the reporting data and the graphical primitives. Drawing primitives (e.g. rendering instructions) that can be included in visualization rendering data can be mapped to facts and/or dimensions contained within the reporting data. Graphical primitives control the rendering of a variety of aspects of the visualization, including the color, style, size, and dimensions of the visualization and/or the portions of the rendering data displayed within the visualizations. In many embodiments, these mappings are expressed using visualization rendering data. Using the visualization rendering data, visualization image data can be rendered. The visualization image data can be rendered using an interest-driven data visualization system and/or by an external server system (such as an interest-driven business intelligence server system) and transferred to the interest-driven data visualization system as appropriate to the requirements of specific applications in accordance with embodiments of the invention. The visualization image data can be used to display the visualization using an interest-driven data visualization system. The use of visualization image data in the display of a visualization provides a memory and processing efficient technique for scaling the number of facts within the reporting data that can be displayed. As the visualization is explored, additional pieces of visualization image data can be rendered and displayed. In this waywas, as users pan and zoom during explorations within the visualization, particular portions of the reporting data can be included within the visualization image data rendered (e.g. a visual representation of the portions of the reporting data is included in the visualization image data) based on the visualization rendering data (and/or reporting data) associated with the visualization. In several embodiments, the particular facts within the reporting data that are included within the rendered visualization image data depend on the portion of the reporting data currently being explored using an interest-driven data visualization device. This allows the user to perform a semantic pan and zoom throughout the reporting data. A semantic zoom functionality provides the user with the ability to view a broad overview of the reporting data within the visualization and then dynamically drill down in increasing detail on particular portions of the reporting data. Similarly, a user can zoom out and view the reporting data from an increasingly broad perspective, allowing the user to quickly identify areas of interest within the reporting data.

In many embodiments of the invention, reports utilized in interest-driven data visualization systems include a set of datasets determined using reporting data received from an interest-driven business intelligence server system and a set of visualizations. Interest-driven data visualization systems are configured to enable the dynamic association of datasets to visualizations to provide a variety of interactive reports describing the data. In a number of embodiments, multiple datasets within a piece of reporting data (or multiple pieces of reporting data) can be visualized within a single visualization by utilizing a trellised visualization. A trellised visualization includes a plurality of visualizations. In several embodiments, at least one of these visualizations is designated as the master visualization and zero or more slave visualizations can be associated with the master visualization(s). Based on the relationships between the master visualizations and the slave visualizations, interactions with the master visualization(s) are mapped to the slave visualizations. In this way, the slave visualizations can be interacted with in concert with the corresponding master visualizations. Each of the visualizations within the trellised visualization is displayed simultaneously by the interest-driven data visualization system.

Additionally, the aspects of the visualization can be dynamically updated in real time. Interest-driven data visualization systems provide access to metadata describing the data available from an interest-driven business intelligence server system and use that metadata to enable requests for new and updated reporting data for use in reports. Metadata storage, including memory included in the interest-driven data visualization system and/or a separate device providing the metadata, is utilized in a variety of embodiments to store the metadata describing the data available from the interest-driven business intelligence server system. In cases where the interest-driven business intelligence server system is unable to immediately provide the requested reporting data, such as in cases where the interest-driven business intelligence server system retrieves and process raw data to generate the requested reporting data, interest-driven data visualization systems are configured to provide an indication of the time remaining until the requested reporting data is available. In several embodiments, interest-driven data visualization systems are configured to incrementally update reports based upon requested reporting data being provided by an interest-driven business intelligence server system.

System Overview

An interest-driven business intelligence system in accordance with an embodiment of the invention is illustrated in FIG. 1. The interest-driven business intelligence system 100 includes a distributed computing platform 110 configured to store raw business data. The distributed computing platform 110 is configured to communicate with an interest-driven business intelligence server system 112 via a network 114. In several embodiments of the invention, the network 114 is a local area network, a wide area network, the Internet, or any other network as appropriate to the requirements of specific applications in accordance with embodiments of the invention. In a variety of embodiments, the distributed computing platform 110 is a cluster of computing devices configured as a distributed computing platform. The distributed computing platform 110 can be configured to act as a raw data storage system and a data warehouse within the interest-driven business intelligence system 100. In a number of embodiments, the distributed computing platform includes a distributed file system configured to distribute the data stored within the distributed computing platform 110 across the cluster computing devices. In many embodiments, the distributed data is replicated across the computing devices within the distributed computing platform, thereby providing redundant storage of the data. The distributed computing platform 110 is configured to retrieve data from the computing devices by identifying one or more of the computing devices containing the requested data and retrieving some or all of the data from the computing devices. In a variety of embodiments where portions of a request for data are stored using different computing devices, the distributed computing platform 110 is configured to process the portions of data received from the computing devices in order to build the data obtained in response to the request for data. Any distributed file system, such as the Hadoop Distributed File System (HDFS), can be utilized as appropriate to the requirements of specific applications in accordance with embodiments of the invention. In several embodiments, the interest-driven business intelligence server system 112 is implemented using one or a cluster of computing devices. In a variety of embodiments, alternative distributed processing systems are utilized. Raw data storage is utilized to store raw data, metadata storage is utilized to store data description metadata describing the raw data, and/or report storage is utilized to store previously generated reports including previous reporting data and previous reporting data requirements. Raw data storage, metadata storage, and/or report storage can be a portion of the memory associated with the interest-driven business intelligence server system 112, the distributed computing platform 110, and/or a separate device in accordance with the specific requirements of specific embodiments of the invention.

The interest-driven business intelligence server system 112 is also configured to communicate via network 114 with one or more interest-driven data visualization systems, including, but not limited to, cellular telephones 116, personal computers 118, and presentation devices 120. In several embodiments, the interest-driven business intelligence server system 112 is implemented using one or a cluster of computing devices. Based upon reporting data requirements obtained from interest-driven data visualization systems, the interest-driven business intelligence server system 112 automatically creates and/or updates one or more interest-driven data pipelines to create or update reporting data. The interest-driven data pipeline is typically configured by pushing down data retrieval jobs to the distributed computing platform 110 to create source data and then applying various filter and/or aggregation processes to the source data using the interest-driven business intelligence server system 112 to produce reporting data that is stored in-memory to improve the response time for producing the reporting data. In a number of embodiments, data retrieval job data is used to represent and transmit a data retrieval job. Any of a variety of job data, including MapReduce job data, which can be executed using a distributed computing platform can be utilized as appropriate to the requirements of specific applications in accordance with embodiments of the invention. In several embodiments, when the reporting data is not stored in-memory, the interest-driven business intelligence server system 112 is configured to generate the reporting data using raw data stored in the distributed computing platform 110. In many embodiments of the invention, interest-driven data visualization systems include any computing device capable of receiving and/or displaying data.

Interest-driven data visualization systems in accordance with embodiments of the invention enable analysts to specify reports including data visualizations that enable the analyst to explore the raw data stored within the distributed computing platform 110 using reporting data generated by the interest-driven business intelligence server system 112. In a number of embodiments, the interest-driven data visualization systems are configured to communicate with the distributed computing platform 110. Reporting data is provided in a variety of forms, including, but not limited to, snowflake schemas and star schemas. In many embodiments, reporting data is any data that includes fields of data (e.g. facts) populated based on raw data stored within the distributed computing platform 110. Interest-driven data visualization systems are configured to create reports having one or more of a variety of visualizations. In several embodiments, a report contains a trellised visualization having a plurality of visualizations based on datasets within the one or more pieces of reporting data. Interest-driven data visualization systems are further configured to generate visualizations based on the datasets using visualization rendering metadata describing the visual appearance of the visualization. In a number of embodiments, the visualization image data is rendered using an interest-driven data visualization system. In many embodiments, the visualization image data is rendered using the interest-driven business intelligence server system 112 and/or the distributed computing platform 110 and transmitted to the interest-driven data visualization system via the network 114.

Interest-driven data visualization systems can receive input in a variety of manners in accordance with embodiments of the invention, including, but not limited to, a web-based interface, a native application, a machine-performed script, and via application programming interface calls. In several embodiments, the input is utilized to render updated visualization image data corresponding to the portion of the reporting data being viewed. The input data can modify one or more visualizations in a variety of ways. The input data can be used to change the visual appearance of the visualization, modify the portion of the reporting data being displayed within a visualization, and/or modify the reporting data underlying the visualization. In a number of embodiments, input data is received with respect to a master visualization in a trellised visualization and the input data is then mapped to the slave visualizations within the trellised visualization. Other modifications and interactions to visualizations can be performed as appropriate to the requirements of specific applications in accordance with embodiments of the invention.

Interest-driven data visualization systems are configured to enable the exploration of the data stored within the interest-driven business intelligence system by creating a data catalog using the metadata describing the data available from the interest-driven business intelligence server system 112 and/or the distributed computing platform. When additional reporting data is requested for use in a report, the interest-driven data visualization system creates and transmits a reporting data request to the interest-driven business intelligence server system 112. The interest-driven business intelligence server system 112 is configured to dynamically update one or more interest-driven data pipelines to create new and/or updated reporting data containing the requested additional reporting data using data received from the distributed computing platform 110. In a number of embodiments, updated visualization image data is rendered based on the updated reporting data; the updated visualization image data can then be used to display the updated reporting data within the visualization. In several embodiments, multiple pieces of visualization image data are rendered and used to display updated reporting data for a plurality of visualizations within a trellised visualization.

Although a specific architecture for an interest-driven business intelligence system in accordance with an embodiment of the invention is conceptually illustrated in FIG. 1, any of a variety of architectures configured to store large datasets and to automatically build interest-driven data pipelines can also be utilized. Systems and methods for interest-driven data visualization systems in accordance with embodiments of the invention are discussed further below Interest-Driven Data Visualization Systems Interest-driven data visualization systems are configured to create reports using datasets determined using reporting data provided by interest-driven business intelligence server systems by mapping fields of data in the datasets to visualization characteristics in the reports. Interest-driven data visualization systems are further configured to enable the exploration a data catalog and request additional reporting data in order to support new and updated reports. An interest-driven data visualization system in accordance with an embodiment of the invention is conceptually illustrated in FIG. 2. The interest-driven data visualization system 200 includes a processor 210 in communication memory 230. The interest-driven data visualization system 200 also includes a network interface 220 configured to send and receive data over a network connection. In a number of embodiments, the network interface 220 is in communication with the processor 210 and/or the memory 230

In several embodiments, the memory 230 is any form of storage configured to store a variety of data, including, but not limited to, reporting data 234 and visualization rendering data 236. In the illustrated embodiment, the memory 230 is also configured to store a data visualization application 232 that configures the processor 210 to perform an interest-driven data visualization process. The interest-driven data visualization process includes, but is not limited to, exploring reporting data having one or more fields of data, defining visualizations by mapping the fields of data to visualizations, and creating a variety of reports using the defined visualizations. Other processes can be included in the interest-driven data visualization process as appropriate to the requirements of specific applications in accordance with embodiments of the invention. In many embodiments, the data visualization application 232, reporting data 234, and/or visualization rendering data 236 are stored using an external server system and received by the interest-driven data visualization system 200 using the network interface 220. External server systems in accordance with a variety of embodiments include, but are not limited to, distributed computing platforms and interest-driven business intelligence server systems. In many embodiments, the data visualization application 232 configures the processor 210 to generate requests for additional reporting data. In a number of embodiments, the processor 210 is configured to transmit the requests using the network interface 220.

In a variety of embodiments, the data visualization process includes generating visualization rendering data 236 based on the reporting data 234. The visualization rendering data includes mappings between facts and/or dimensions within the reporting data and drawing primitives. The drawing primitives can be utilized to render visualization image data that is utilized in the display of visualizations of the reporting data 234. As the reporting data is explored, the visualization rendering data 236 is utilized to render additional pieces of visualization image data. In this way, an analyst can pan around a set of reporting data using a visualization associated with the reporting data. In several embodiments, subsets of the facts present in the reporting data are included in the rendered visualization image data based on the portion of the rendering data being explored. In this way, the visualization rendering data 236 and corresponding visualization image data can provide a semantic zoom functionality to dynamically display increasing (or decreasing) details of the reporting data based on the portion of the reporting data being explored. In a variety of embodiments, multiple pieces of visualization image data are rendered for a plurality of datasets represented in a trellised visualization. The datasets can be derived from one or more pieces of reporting data, allowing for multiple pieces of reporting data to be analyzed simultaneously.

Figure 2:
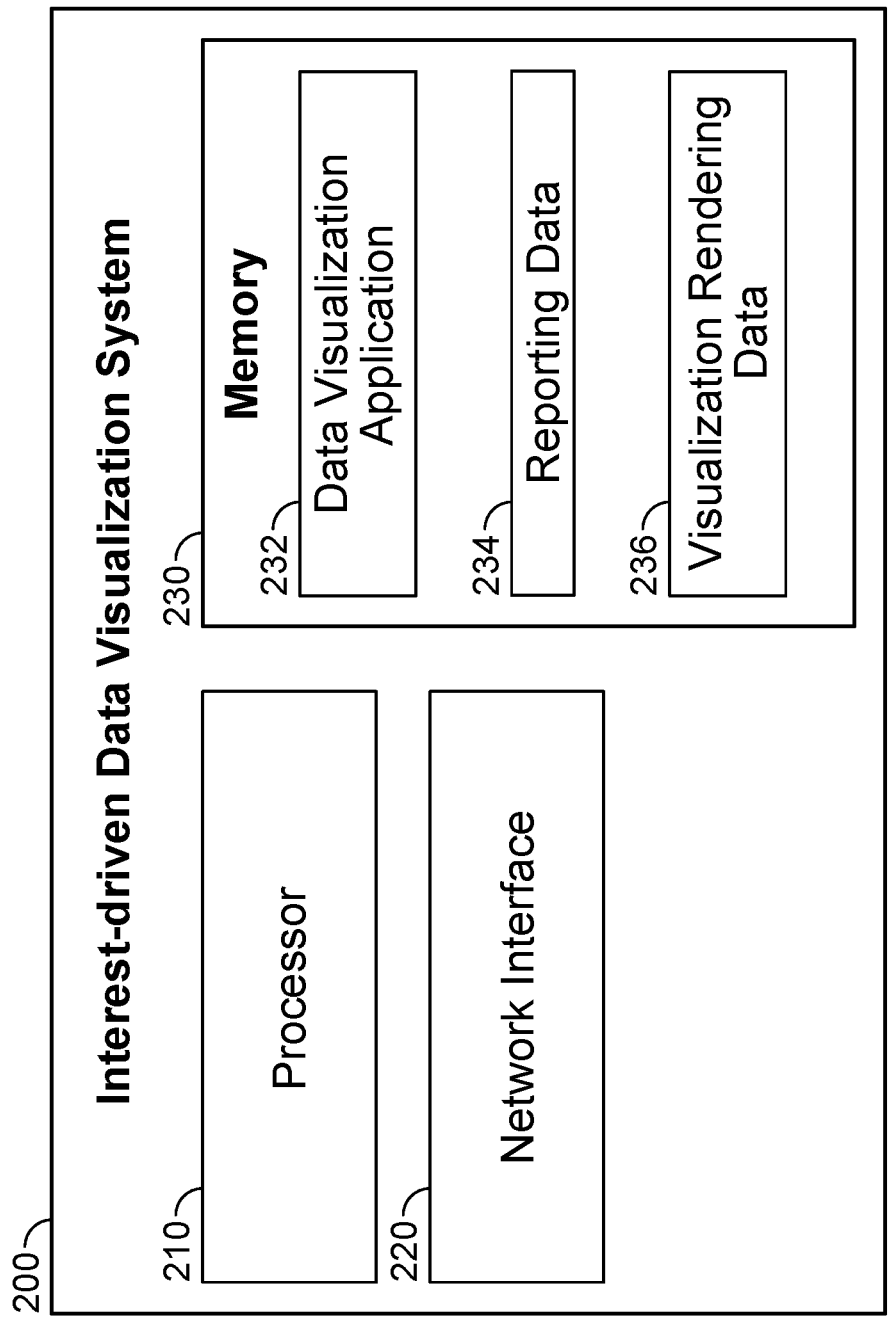
FIG. 2 is a conceptual illustration of an interest-driven data visualization system in accordance with an embodiment of the invention.

Although a specific architecture for an interest-driven data visualization system in accordance with an embodiment of the invention is conceptually illustrated in FIG. 2, any of a variety of architectures, including those which store data or applications on disk or some other form of storage and are loaded into memory at runtime, can also be utilized in accordance with embodiments of the invention. Methods for interest-driven data visualization in accordance with embodiments of the invention are discussed further below.

Interest-Driven Data Visualization

Figure 4:
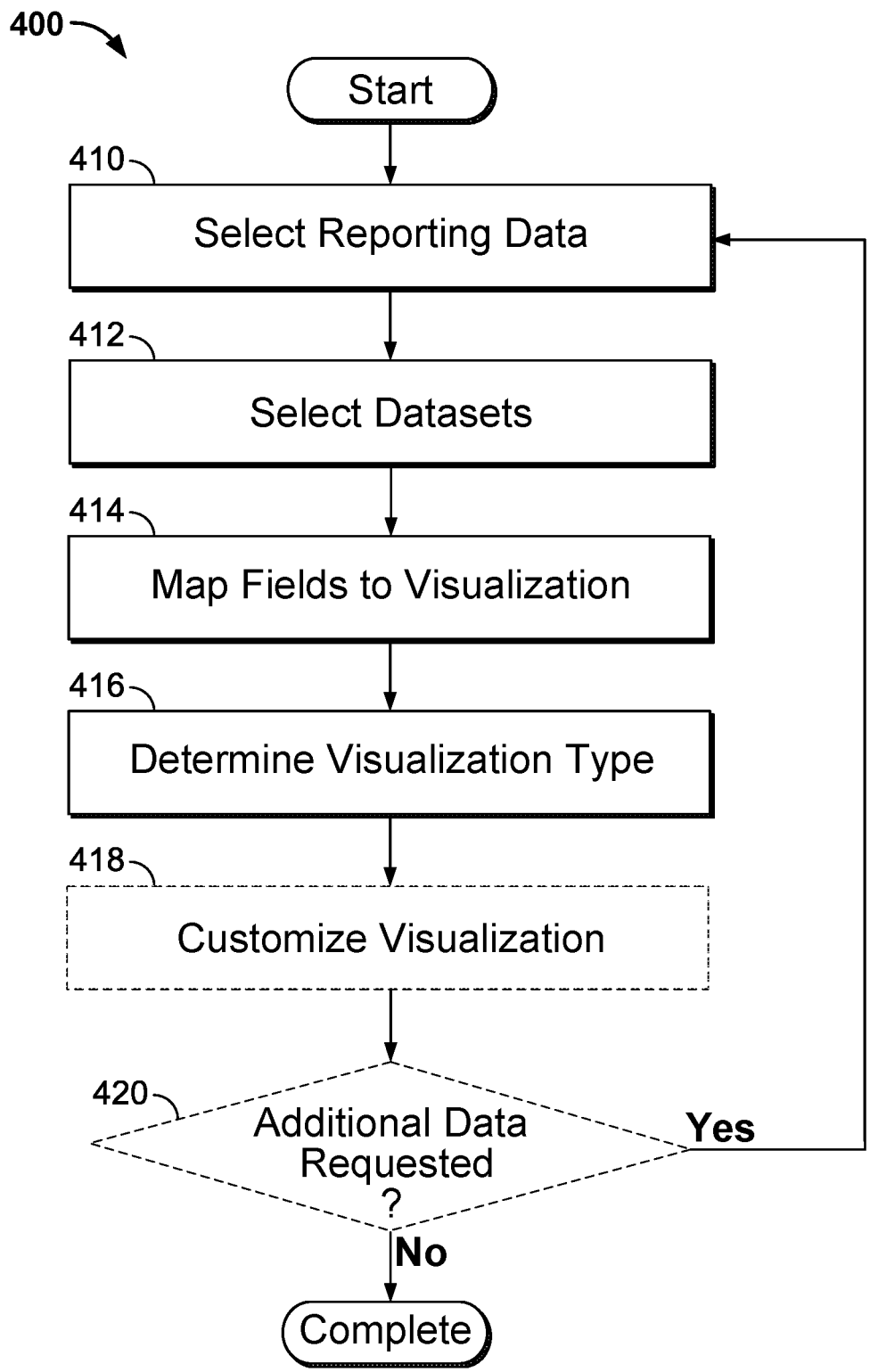
FIG. 4 is a flow chart illustrating a process for the interest-driven visualization of data in accordance with an embodiment of the invention.

Reports are the primary method for analysts to visualize, explore, and present data stored in interest-driven business intelligence systems. Interest-driven data visualizations systems are configured to enable generation of and interaction with reports. Reports generated using interest-driven data visualization systems can also define and cause updates to interest-driven data pipelines. A process for interest-driven data visualization in accordance with an embodiment of the invention is illustrated in FIG. 4. The process 400 includes selecting (410) reporting data. Datasets are selected (412). Data fields in the datasets are mapped (414) to a visualization. The visual appearance of the visualization is determined (416). In a number of embodiments, the visualization is customized (418). If additional reporting data is requested (420), additional reporting data is selected (410). If additional reporting data is not requested (420), the process completes.

In a variety of embodiments, the selected (410) reporting data is received from an interest-driven business intelligence server system. The reporting data includes one or more datasets. In a number of embodiments, selecting (412) datasets includes selecting datasets present in the selected (410) reporting data. In many embodiments, selecting (412) datasets includes selecting datasets in reporting data that is retrieved from an interest-driven business intelligence server system. In many embodiments, reporting data requirements include the selected (412) datasets. In several embodiments, reporting data requirements further include references to one or more data sources from which the selected (412) datasets can be retrieved. Datasets include one or more data fields. In several embodiments, mapping (414) data fields to a visualization includes associating data fields with visualization characteristics defined in the visualization. In many embodiments, mapping (414) data fields to a visualization is performed utilizing a generic mapping and/or a mapping based on a mapping template. In a variety of embodiments, a generic mapping and/or a mapping template can be used to map (414) data fields to a visualization using reporting data metadata describing the specific data stored in the data fields and matching the description of the data fields to specific properties of the visualization. In this way, mapping (414) data fields to a visualization allows generalized visualizations to be applied to a variety of reporting data. In several embodiments, the mapping (414) of data fields to the visualization is performed automatically based on the selected (412) datasets and/or the selected (410) reporting data.

Many types of visualizations can be created using interest-driven data systems, including, but not limited to, bar graphs, column graphs, pie charts, line graphs, point graphs, and heat maps. Visualizations can be two dimensional, three dimensional, or n-dimensional depending on the type of visualization and the mapped (414) fields. In a number of embodiments, the type of visualization is determined (416) dynamically based upon the mapped (414) data fields. In a variety of embodiments, a plurality of visualizations are determined (416) dynamically based upon the mapped (414) data fields. In several embodiments, the type of visualization is determined (416) manually. In many of embodiments, customizing (418) a visualization includes changing the width, height, colors, scale, and geometry of the visualization. A number of properties that can be customized (418) in a visualization not specifically listed above can be utilized according to the requirements of a specific application in accordance with a variety of embodiments of the invention.

In several embodiments, requesting (420) additional reporting data includes selecting (410) additional reporting data present in the interest-driven data visualization system. In many embodiments, requesting (420) additional reporting data includes receiving additional reporting data from an interest-driven business intelligence server system. In a variety of embodiments, requesting (420) additional reporting data includes receiving incremental reporting data updates from an interest-driven business intelligence server system, where the interest-driven business intelligence server system configures an interest-driven data pipeline to generate one or more pieces of incremental reporting data using aggregate data generated utilizing unstructured raw data. The raw data can be stored in a variety of systems, including a distributed data storage system. Systems and methods for generating reporting data using a distributed data storage system that can be utilized in accordance with embodiments of the invention are disclosed in U.S. patent application Ser. No. 13/790,624, titled "Systems and Methods for Interest-Driven Distributed Data Server Systems" the entirety of which is hereby incorporated by reference. Additional processes for requesting (420) additional reporting data in accordance with a number of embodiments are described below with respect to FIG. 7.

Figure 3:
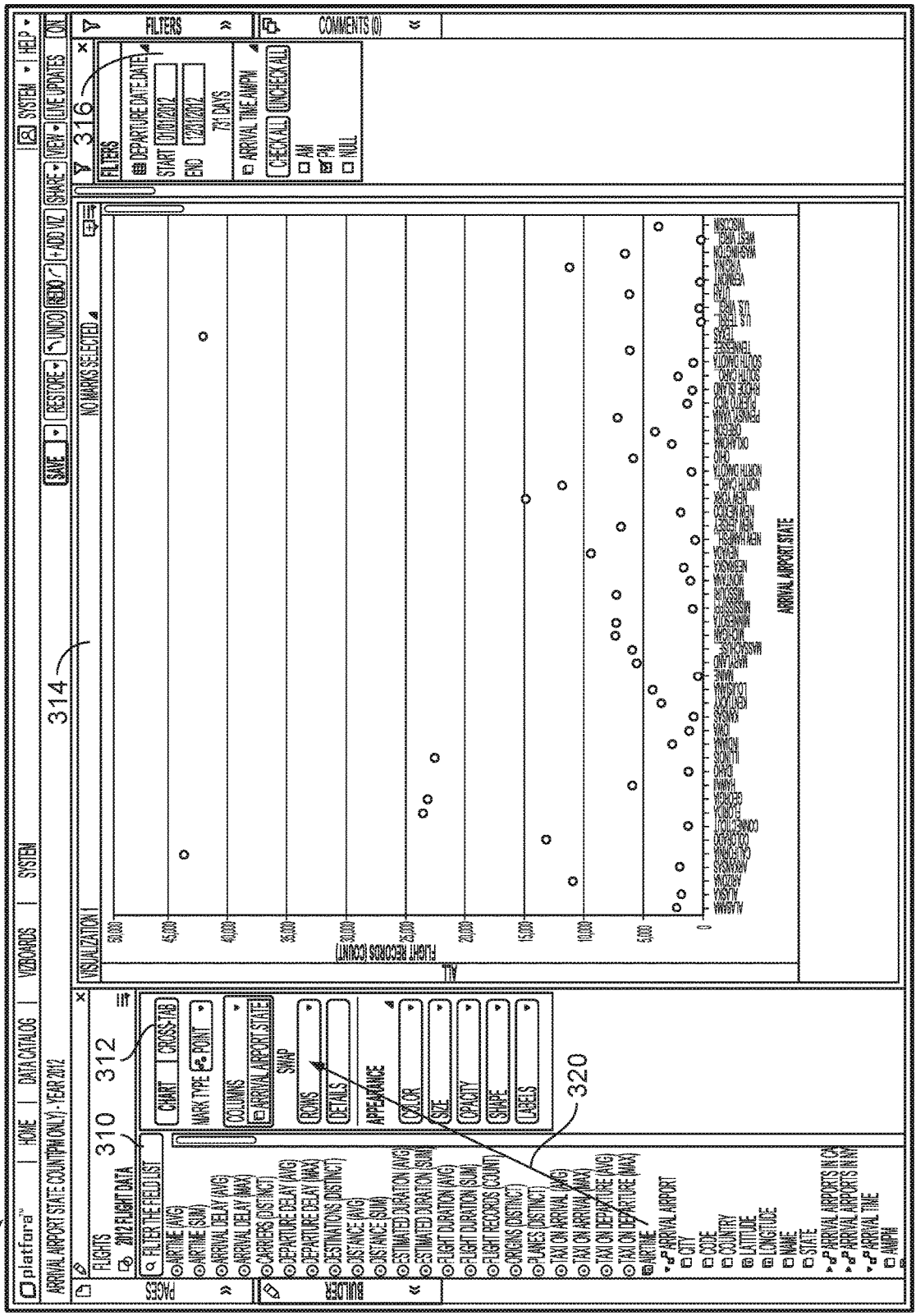
FIG. 3 is an illustration of the visual appearance of an interest-driven data visualization system in accordance with an embodiment of the invention.

Turning now to FIG. 3, an example user interface utilized in interest-driven data visualization systems to perform interest-driven data visualization in accordance with an embodiment of the invention is illustrated. The user interface 300 includes a plurality of datasets 310, a set of visualization characteristics 312, a rendered visualization 314, and a set of filters 316. Datasets 310 typically indicate a number of data fields present in the datasets selected from one or more pieces of reporting data and/or metadata received from an interest-driven business intelligence server system. The set of visualization characteristics 312 includes a listing of all the visualization characteristics for the rendered visualization 314, along with an indication of which data fields have been mapped to which visualization characteristics. One mapping present between datasets 310 and the visualization characteristics 320 is mapping 320 of data field 'Arrival Airport_State' to visualization characteristic 'Columns.' A number of mappings not specifically illustrated can be utilized according to the requirements of a variety of embodiments of the invention. The rendered visualization 314 is the visualized representation of the mappings and can be updated and modified by adjusting the visualization characteristics 312. The set of filters 316 includes filters that can be utilized to change the display of rendered visualizations 314 without modifying the mappings of data fields to visualization characteristics. A specific interface is described above with respect to FIG. 3; however, a variety of user interfaces can be utilized as appropriate to the requirements of specific applications in accordance with embodiments of the invention.

Although a specific process for interest-driven data visualization is described above with respect to FIG. 4, any of a variety of processes can be utilized in accordance with embodiments of the invention. Processes for creating visualizations, selecting data for reports, and exploring data using interest-driven data visualization systems in accordance with embodiments of the invention are discussed further below.

Creating Visualizations in Interest-Driven Data Visualization Systems

Figure 5:
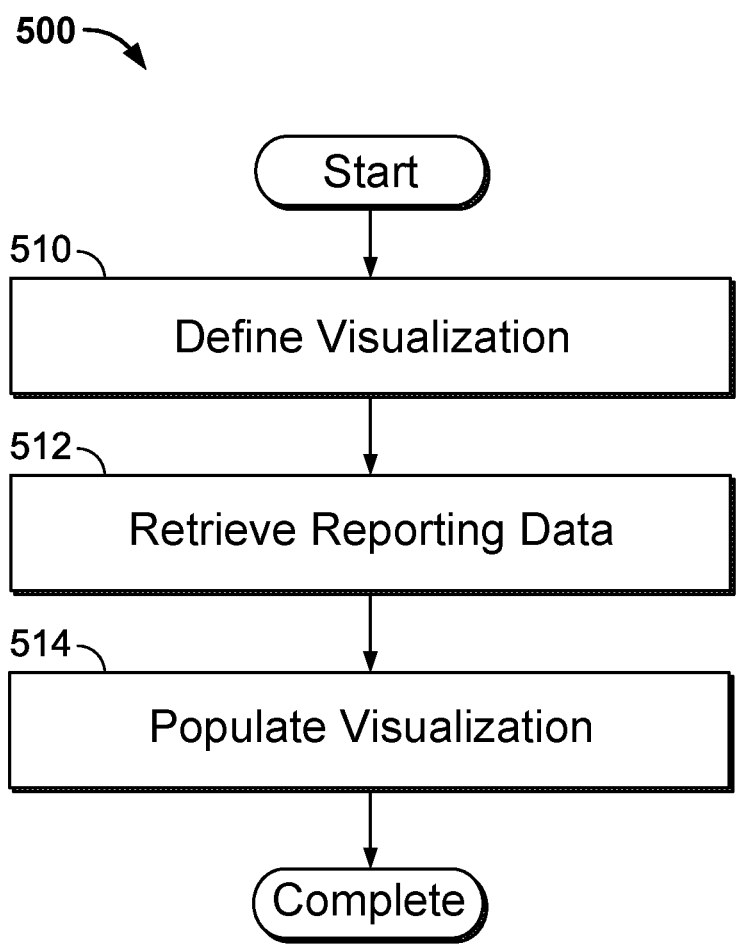
FIG. 5 is a flow chart illustrating a process for creating a visualization using an interest-driven data visualization system in accordance with an embodiment of the invention.

Visualizations, as the name suggests, are the actual viewable representations of reporting data present in an interest-driven data visualization system. Visualizations associate pieces of reporting data in a report with a displayable representation of the reporting data. In this way, visualizations enable the interpretation and exploration of a report by analyzing one or more pieces of reporting data in the report. A process for defining and populating visualizations in accordance with an embodiment of the invention is illustrated in FIG. 5. The process 500 involves defining (510) a visualization. In several embodiments, defining (510) a visualization includes defining filters and/or aggregations on data stored in an interest-driven business intelligence server system. In a variety of embodiments, defining filters and/or aggregations causes the interest-driven data visualization system to request additional reporting data from an interest-driven business intelligence server system. In many embodiments, defining (510) a visualization involves performing operation on an OLAP cube, such as slicing, dicing, and drilling down. In a variety of embodiments, the OLAP cube is present in the interest-driven data visualization system. In a number of embodiments, the OLAP cube is not present in the interest-driven data visualization system and is generated by an interest-driven business intelligence server system. In several embodiments, the interest-driven business intelligence server system generates the OLAP cube by dynamically recompiling an interest-driven data pipeline to generate the OLAP cube. Defining (510) visualizations can also involve the creation of and interaction with a variety of data summarizations, such as pivot tables or rollups.

Once the visualization is defined, the reporting data containing the data that supports the visualization is retrieved (512). In a number of embodiments, reporting data can be any number of in-memory data models, such as an OLAP cube, a relational model, or objects stored in the interest-driven data visualization system. Using the reporting data, the visualization is populated (514), enabling the viewing of the data present in the visualization.

Although a specific process for creating visualizations is illustrated in FIG. 5, any of a variety of processes can be utilized to create visualizations using an interest-driven data visualization system in accordance with embodiments of the invention. Processes for exploring data and visualizing information related to reports using interest-driven data visualization systems in accordance with embodiments of the invention are discussed further below.

Figure 6:
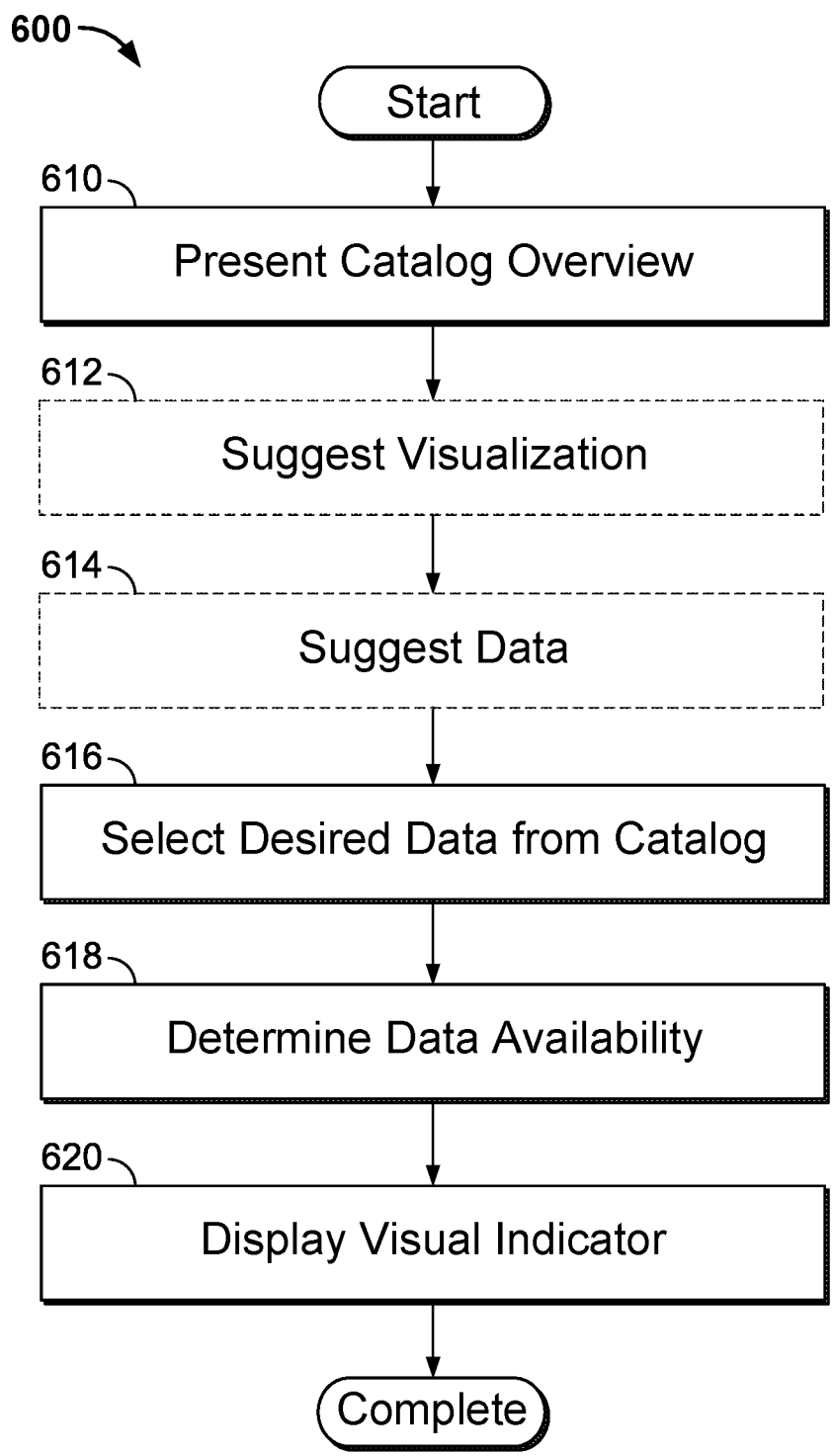
FIG. 6 is a flow chart illustrating a process for estimating time requirements for analyst-generated actions using an interest-driven data visualization system in accordance with an embodiment of the invention.

Visualizing Estimated Execution Time in Interest-Driven Data Visualization Systems Interest-driven data visualization systems dynamically provide analysts with access to a variety of data via reporting data and metadata generated by an interest-driven business intelligence server system. Interest-driven data visualization systems typically provide a data catalog containing a listing of the data available within the interest-driven business intelligence system. In many cases, the available data is not currently accessible via the reporting data, such as an OLAP cube, provided by the interest-driven business intelligence server system that is being used to generate the report that the analyst is currently exploring. In this way, the analyst's exploration of the report is not limited by the reporting data generated by the interest-driven business intelligence server system. The interest-driven visualization system can provide instructions to the interest-driven business intelligence server system enabling the automatic recompiling of an interest-driven data pipeline to provide the analyst with new reporting data capable of generating new reports and/or visualizations that meet the analyst's data requests. However, the interest-driven business intelligence server system providing the reporting data may not be able to provide the data in a low-latency fashion in all cases. A process for estimating the amount of time involved in providing a particular piece of data, set of data, aggregation of data, and/or visualization to an analyst in accordance with an embodiment of the invention is illustrated in FIG. 6. The process 600 involves presenting (610) a catalog overview; the catalog overview includes a listing of data available via the interest-driven business intelligence server system. In a number of embodiments, the listing of data includes data present in reporting data contained in the interest-driven data visualization system. In a variety of embodiments, the listing of data includes data derived from metadata describing the raw data and/or aggregate data present on an interest-driven business intelligence server system.

In many embodiments, the interest-driven data visualization system suggests (612) visualizations which can be of interest to an analyst. In a number of embodiments, the interest-driven data visualization system suggests (614) data that the analyst can be interested in exploring. The desired data is selected (616) from the catalog. The availability of the data is determined (618) and a visual indicator is displayed (620) indicating the amount of time to retrieve the desired data. The availability of the data can be determined by the interest-driven data visualization system and/or the interest-driven business intelligence server system in accordance with embodiments of the invention. In several embodiments, the availability of the data is determined (618) using the metadata describing the data available on the interest-driven business intelligence server system and/or the reporting data.

For example, a stoplight system can be utilized to indicate the amount of time to retrieve the desired data: green indicates the data can be accessed quickly, yellow indicates the data can be accessed in a few minutes, and red indicates that accessing the data may not be available from the interest-driven business intelligence server system for several hours. A variety of other indicators, such as a predicted time, can be utilized as appropriate to the specific requirements of specific embodiments of the invention. Processes for providing data that can be utilized to indicate the availability and/or performance characteristics of data are described in U.S. patent application Ser. No. 14/060,575, titled "Systems and Methods for Providing Performance Metadata in Interest-Driven Business Intelligence Systems" and filed Oct. 22, 2013, the disclosure of which is hereby incorporated by reference in its entirety. In many embodiments, alerts are associated with the availability of the data. As portions of the data become available, an alert is triggered. A variety of alerts can be utilized in accordance with the specific requirements of specific embodiments of the invention, including, but not limited to, pop-up alerts, sound alerts, email alerts, telephone alerts, social media alerts, and small messaging service alerts. For example, if a year worth of records are requested and the first six months of data can be produced in ten minutes and the second six months of data will take a week to be generated, the interest-driven data visualization system can provide the first six months of data and generate reports and visualizations using the first six months of data and an email alert is set. After a week, when the second six months of data becomes available, an email alert is sent notifying interested users that the second six months of data is now available and that reports and visualizations can be created with the full year worth of records.

Although a specific process for estimating data access times using interest-driven data visualization systems is described above with respect to FIG. 6, any of a variety of processes can be utilized in accordance with embodiments of the invention. These processes can be based on a variety of metrics, particularly those described with respect to U.S. patent application Ser. No. 14/060,575. Processes for exploring data using interest-drive data visualization systems in accordance with embodiments of the invention are discussed further below.

Data Exploration in Interest-Driven Data Visualization Systems

Figure 7:
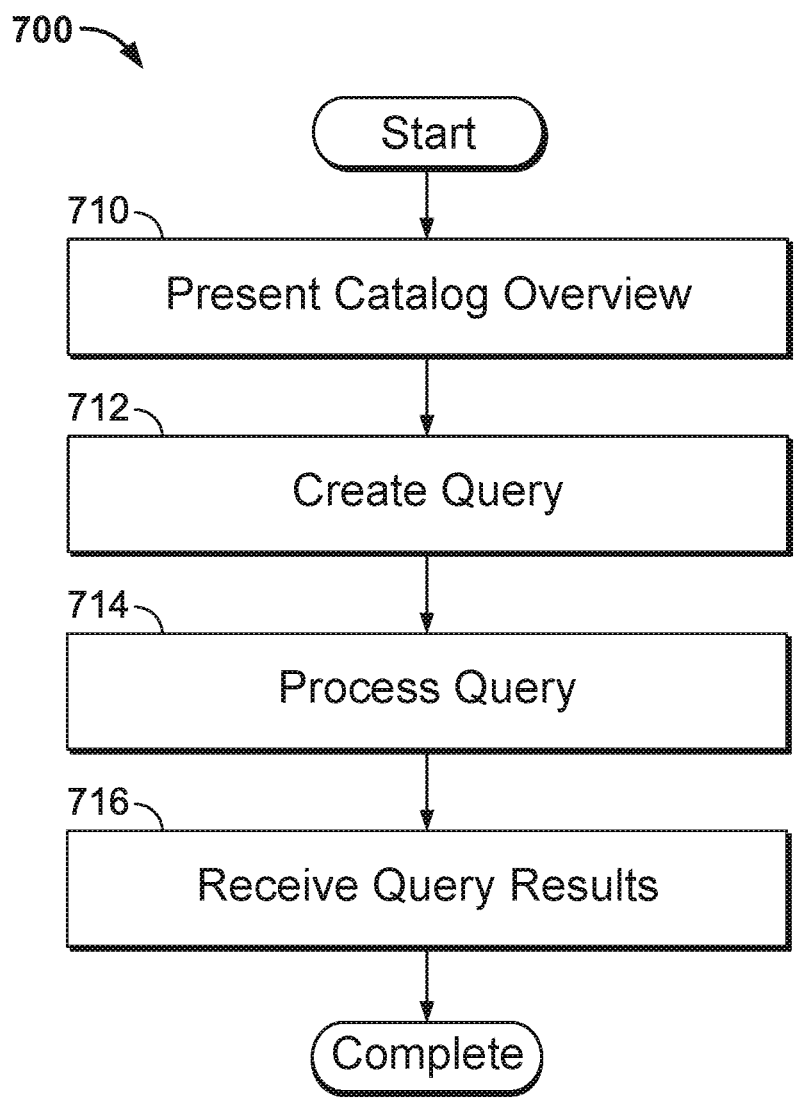
FIG. 7 is a flow chart illustrating a process for data exploration using an interest-driven data visualization system in accordance with an embodiment of the invention.

Interest-driven data visualization systems enable the exploration of data contained in interest-driven business intelligence systems and the interaction with that data, enabling analysts to find additional reporting data for generating reports. A process for data exploration using an interest-driven data visualization system in accordance with an embodiment of the invention is illustrated in FIG. 7. The process 700 involves presenting (710) a catalog overview; the catalog overview includes a listing of data available within an interest-driven business intelligence system; that is, within an interest-driven business intelligence server system and/or a distributed computing platform. In several embodiments, the catalog overview is generated based on reporting data and metadata describing available data provided by the interest-driven business intelligence server system. Queries are created (712) utilizing the data present in the catalog overview. The query is processed (714). The results of the query are received (716) by the interest-driven data visualization system.

In many embodiments, the processing (714) of the query is performed utilizing an interest-driven data pipeline, such as, but not limited to, one of the interest-driven data pipelines described in U.S. Pat. No. 8,447,721, incorporated by reference above. In a variety of embodiments, the processed (714) query results in new reporting data being generated using the interest-driven business intelligence server system and received (716) by the interest-driven data visualization system. In a number of embodiments, the received (716) reporting data is added as one or more datasets available in the interest-driven data visualization system. In several embodiments, the processed (714) query results include new and/or updated metadata describing the data available within the interest-driven business intelligence system being received by the interest-driven data visualization system. In many embodiments, the received (716) metadata is included in the data catalog, enabling the further exploration of the data within the interest-driven business intelligence system.

In a number of embodiments, the results of the query are capable of being used by all analysts of the interest-driven data visualization system. This sharing of query results can lead to many interesting features in an interest-driven data visualization system. For example, a collaborative aspect incorporating communication functionality along with sharing query results is provided in many interest-driven data visualization systems in embodiments of the invention. Portable visualizations can be generated and shared among a variety of interest-driven data visualization systems (or among different reports in the same interest-driven data visualization system), where the portable visualizations are mapped to pieces of reporting data in different reports using metadata describing the properties of the pieces of reporting data. In this way, appropriate pieces of reporting data to the visualization can be identified and mapped to the visualization, enabling the same visualization to be re-used across reports and interest-driven data visualization systems. Interest-driven data visualization systems in accordance with many embodiments of the invention include a marketplace where particular queries and custom visualizations can be bought and sold across different businesses utilizing interest-driven data visualization systems. Fields in the visualizations can be mapped to specific pieces of reporting data within an interest-driven business intelligence system associated with the acquiring business using metadata describing the characteristics of the reporting data and matching those characteristics with the fields in the visualization, thereby creating a replacement report where the original reporting data has been replaced with the reporting data associated with the acquiring business.

A specific process for data exploration in interest-driven data visualization systems in accordance with embodiments of the invention is described above with respect to FIG. 7; however, a variety of processes can be utilized in accordance with embodiments of the invention.

Visualization Snapshots

Figure 8:
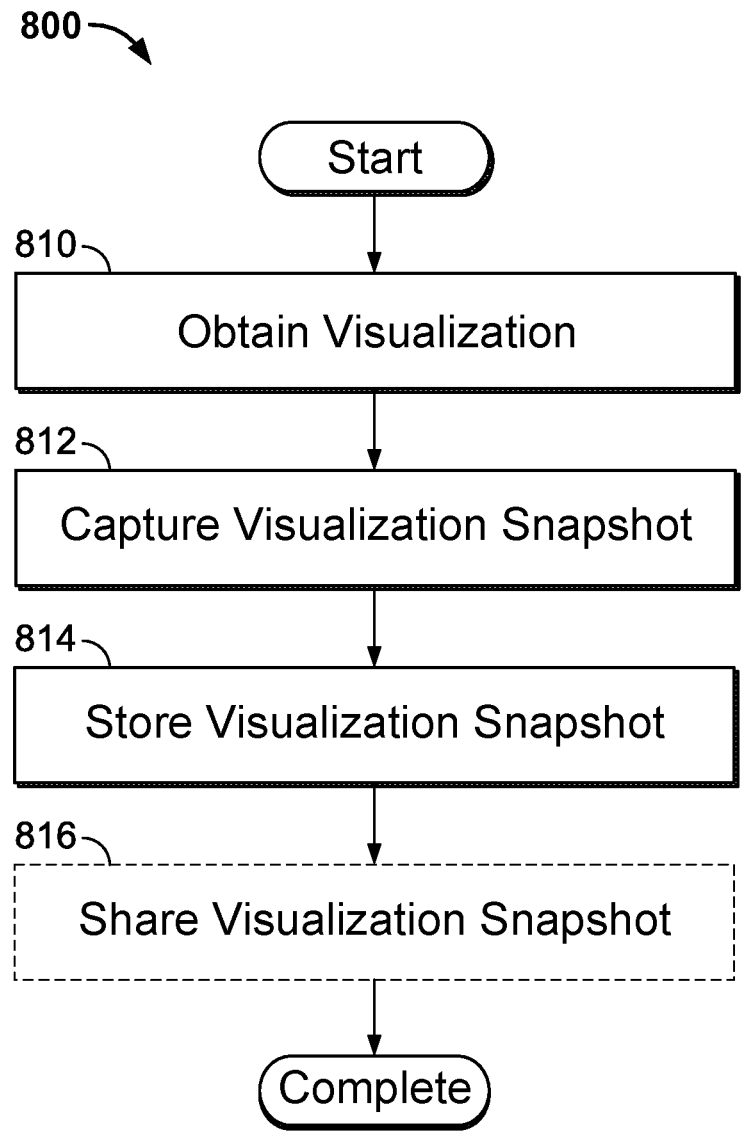
FIG. 8 is a flow chart illustrating a process for creating visualization snapshots using an interest-driven data visualization system in accordance with an embodiment of the invention.

Once a visualization has been created, it can be stored and shared with a variety of sources. The stored visualization can include the reporting data associated with the visualization so that the stored visualization can be displayed on a device that does not have access to an interest-driven business intelligence server system from which the reporting data can be retrieved. A process for creating and displaying visualization snapshots in accordance with an embodiment of the invention is shown in FIG. 8. The process 800 includes obtaining (810) a visualization. A visualization snapshot is captured (812). The visualization snapshot is stored (814). In many embodiments, the visualization snapshot is shared (816).

In a variety of embodiments, a visualization is obtained (810) by associating reporting data in a report, where the reporting data includes aggregate data created using unstructured raw data stored in a distributed processing system. A variety of processes for creating visualizations that can be obtained (810) in accordance with embodiments of the invention are discussed above. In a number of embodiments, capturing (812) a snapshot visualization includes capturing the properties of the obtained (810) visualization along with a portion of the reporting data associated with the obtained (810) visualization. In several embodiments, the entire report (and/or additional data) is included with the captured (812) visualization snapshot. In a number of embodiments, the visualization snapshot can be stored (814) using the interest-driven data visualization system and/or a remote system separate from the interest-driven data visualization system. In a variety of embodiments, sharing (816) the visualization snapshot includes transmitting the visualization snapshot to a remote system separate from the interest-driven data visualization system. In many embodiments, the remote system is configured to display the visualization snapshot using the reporting data contained within the visualization snapshot. In several embodiments, the remote system is configured to communicate with an interest-drive business intelligence system to request updated data based on the reporting data stored in the visualization snapshot.

Processes for creating and sharing visualization snapshots in accordance with embodiments of the invention are discussed above with respect to FIG. 8; however, a variety of processes can be utilized in accordance with embodiments of the invention.

Displaying Interest-Driven Data Visualizations

Figure 9:
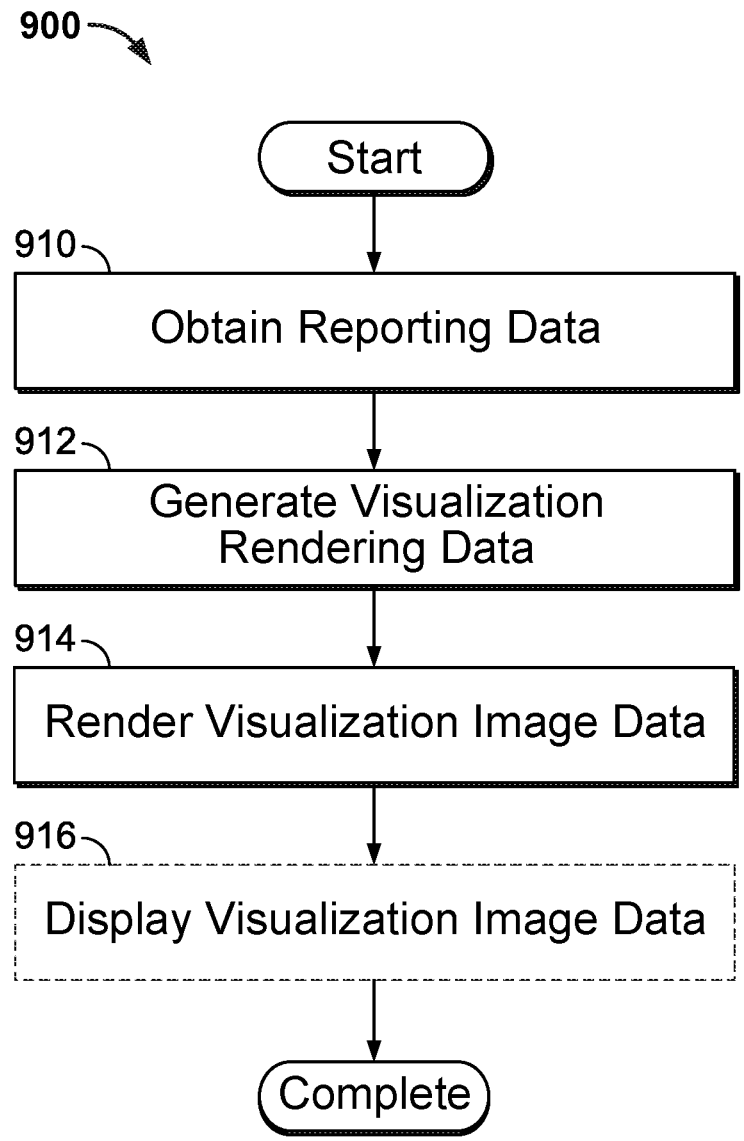
FIG. 9 is a flow chart illustrating a process for displaying an interest-driven data visualization using visualization image data in accordance with an embodiment of the invention.

As the number of facts (and/or datasets) within a set of reporting data increases, the memory and processing power used to display visualizations based on the reporting data increases. By rendering visualization image data based on the reporting data and displaying the visualization image data, the memory and processing requirements used to display the visualization is disassociated from the size of the reporting data. This provides for a highly scalable and efficient technique to display and explore reporting data of ever-increasing sizes. Interest-driven data visualization systems in accordance with embodiments of the invention are configured to render visualization image data based on reporting data and utilize the visualization image data in the display and exploration of the reporting data. A process for displaying interest-driven data visualizations is shown in FIG. 9. The process 900 includes obtaining (910) reporting data. Visualization rendering data is generated (912) and visualization image data is rendered (914). In many embodiments, visualization image data is displayed (916).

In a variety of embodiments, the reporting data is obtained (910) utilizing techniques similar to those described above. In several embodiments, some or all of the obtained (910) reporting data is discarded once the visualization rendering data is generated (912). In many embodiments, generating (912) visualization rendering data includes associating one or more facts within the obtained (910) reporting data with drawing primitives. In a number of embodiments, drawing primitives include metadata that configure a rendering process to generate an object with a particular set of visual properties (e.g. with a particular appearance).

Visual properties include shape, line color, line weight, line style, transparency, fill color, visual effects, distance, and any other visual property as appropriate to the requirements of specific applications in accordance with embodiments of the invention. The drawing primitives can be utilized to generate raster images (e.g. sprites), vector objects, three-dimensional models, and any other image component as appropriate to the requirements of specific applications in accordance with embodiments of the invention. In several embodiments, rendering (914) visualization image data includes configuring a rendering process using the generated (912) visualization rendering data to render visualization image data based on the obtained (910) reporting data. The rendered (914) visualization image data can include a raster image (e.g. a bitmap), a vector image, a three-dimensional model, a point cloud, or any other type of image data as appropriate to the requirements of specific applications in accordance with embodiments of the invention. Raster images can be uncompressed and/or compressed utilizing any of a variety of known techniques including, but not limited to, JPEG compression and PNG compression. Similarly, any of a number of formats, including (but not limited to) the Scalable Vector Graphics (SVG) format, can be utilized for vector images. In a variety of embodiments, the rendered (914) visualization image data has a fixed size. In many embodiments, the rendered (914) visualization image data falls within a threshold) size, e.g. the visualization image data will consume an amount of memory not to exceed a threshold value. The threshold value can be predetermined and/or determined based on the capabilities of the interest-driven data visualization system configured to display the visualization image data.

Techniques similar to those described above can be utilized to display (916) the visualization image data as part of a visualization associated with the obtained (910) reporting data as appropriate to the requirements of specific applications in accordance with embodiments of the invention. In this way, the visualization image data is displayed by an interest-driven data visualization system, providing an efficient method to present huge amounts of reporting data.

Processes for displaying interest-driven data visualizations in accordance with embodiments of the invention are discussed above with respect to FIG. 9; however, a variety of processes, including those that obtain visualization image data from an external server system, can be utilized in accordance with embodiments of the invention. Processes for interacting with interest-driven data visualizations in accordance with embodiments of the invention are described below.

Displaying Interactions with Visualizations

Figure 10:
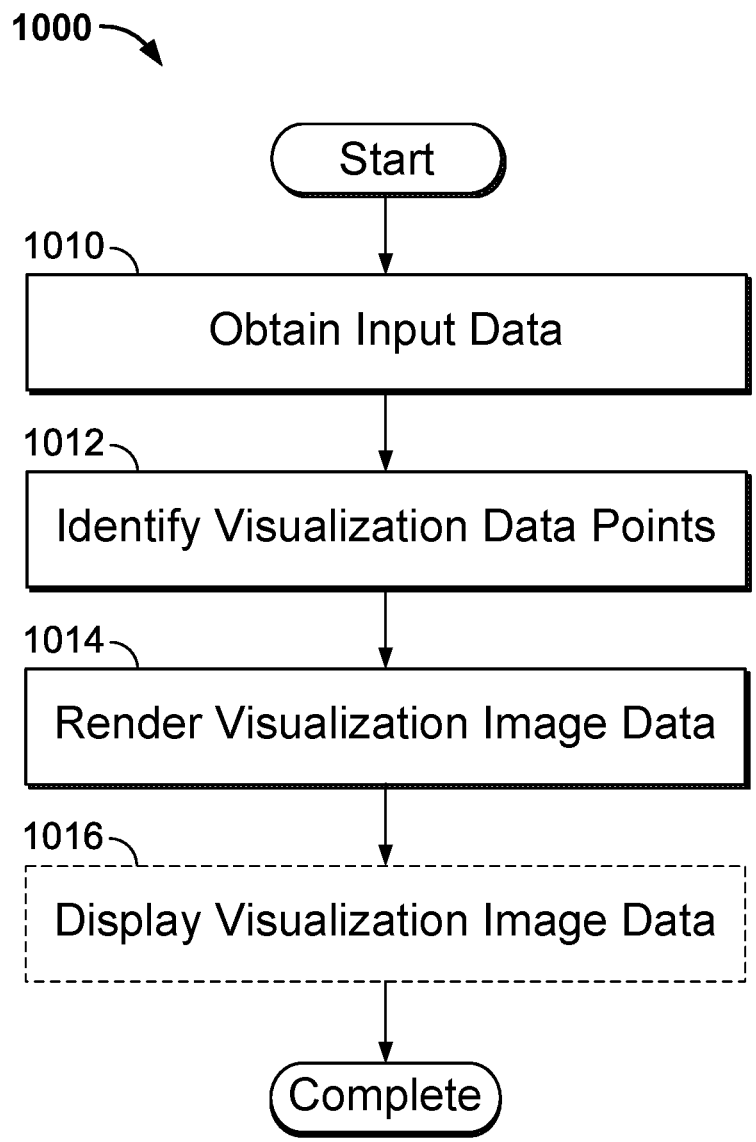
FIG. 10 is a flow chart illustrating a process for displaying interactions with a visualization using visualization image data in accordance with an embodiment of the invention.

As described above, users can take a variety of actions with respect to a visualization generated for a set of reporting data. Interest-driven data visualization systems in accordance with embodiments of the invention are configured to display visualizations utilizing visualization image data rendered based on the actions performed with respect to the visualization. A process for displaying interactions with visualizations is shown in FIG. 10. The process 1000 includes obtaining (1010) input data and identifying (1012) visualization data points. Visualization image data is rendered (1014) and, in a variety of embodiments, visualization image data is displayed (1016).

In many embodiments, the obtained (1010) input data identifies a portion of a visualization. In a number of embodiments, the obtained (1010) input data indicates a particular action to take with respect to the visualization. Actions include, but are not limited to, pan, zoom in, zoom out, reset zoom, and rotate. It should be noted that any action could be utilized as appropriate to the requirements of specific applications in accordance with embodiments of the invention. In several embodiments, the identified (1012) visualization data points include a subset of facts contained within a set of reporting data associated with the visualization. In a variety of embodiments, the identified (1012) visualization data points include one or more pieces of visualization rendering data. In many embodiments, the rendered (1014) visualization image data is based on the identified (1012) visualization data points and the visualization rendering data. Techniques similar to those described above can be utilized to render (1014) the visualization image data and/or display (1016) the visualization image data as appropriate to the requirements of specific applications in accordance with embodiments of the invention. In many embodiments, smooth transitions between the original visualization image data and the rendered (1014) visualization image data can be utilized. Smooth transitions can be implemented in a variety of ways as appropriate to the requirements of specific applications in accordance with embodiments of the invention. In many embodiments, smooth transitions include interpolating between the original visualization image data and the rendered (1014) visualization image data. In a variety of embodiments, smooth transitions are achieves achieved by rendering (1014) and displaying (1016) multiple intermediate pieces of visualization image data, where the intermediate pieces of visualization image data represent views of the reporting data from various perspectives between the original perspective of the visualization and the updated visualization of the perspective.

Figure 11A:
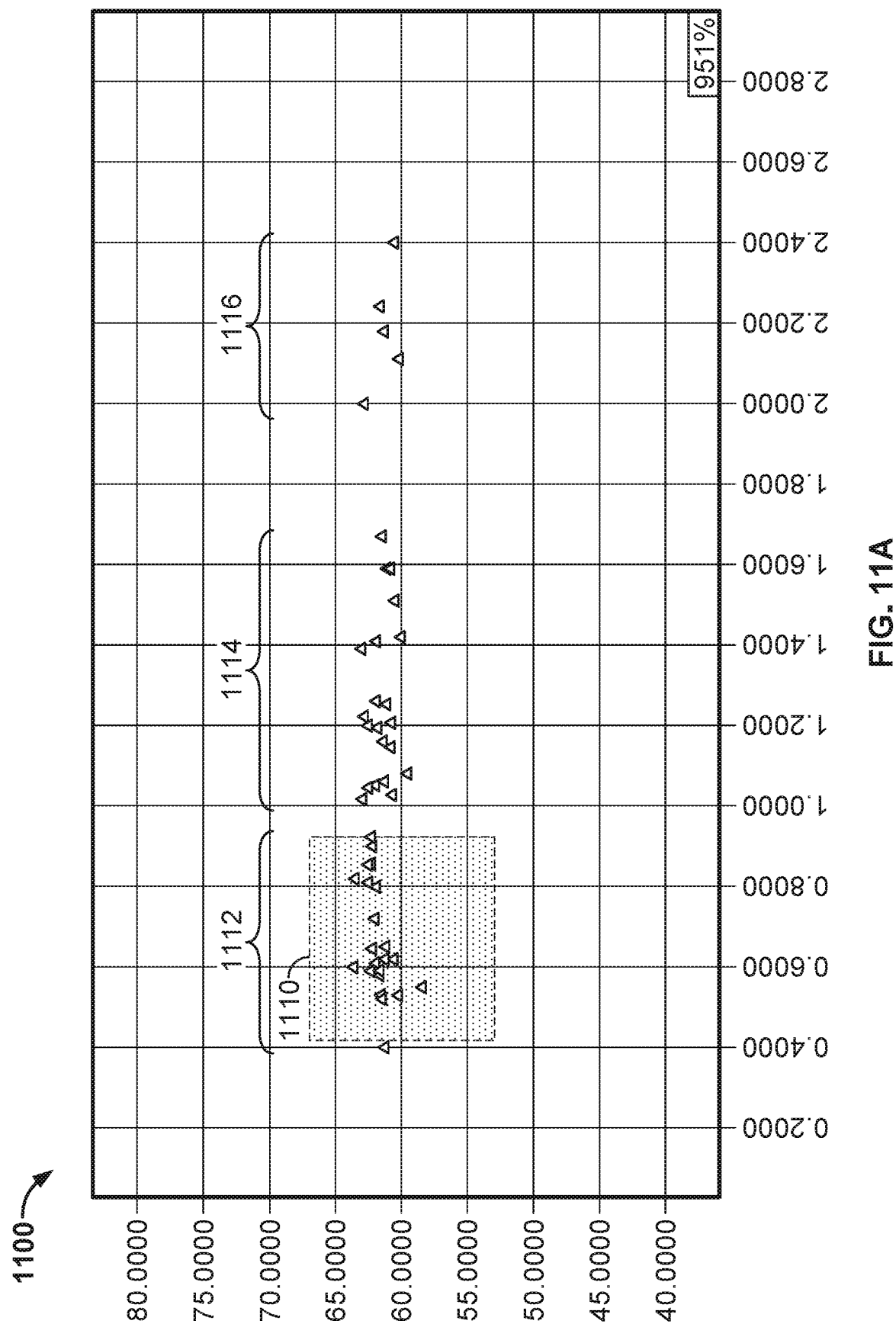
FIGS. 11A-11C are illustrations of the visual appearance of a zoom functionality within a visualization in accordance with an embodiment of the invention.

Turning now to FIG. 11A, an illustration of a visualization rendered using visualization image data in accordance with an embodiment of the invention is shown. The visualization 1100 includes a first set of visualization data points 1112, a second set of visualization data points 1114, and a third set of visualization data points 1116. The visualization 1100 further includes input data 1110 indicating that the first set of visualization data points 1112 has been identified for further exploration.

Figure 11B:
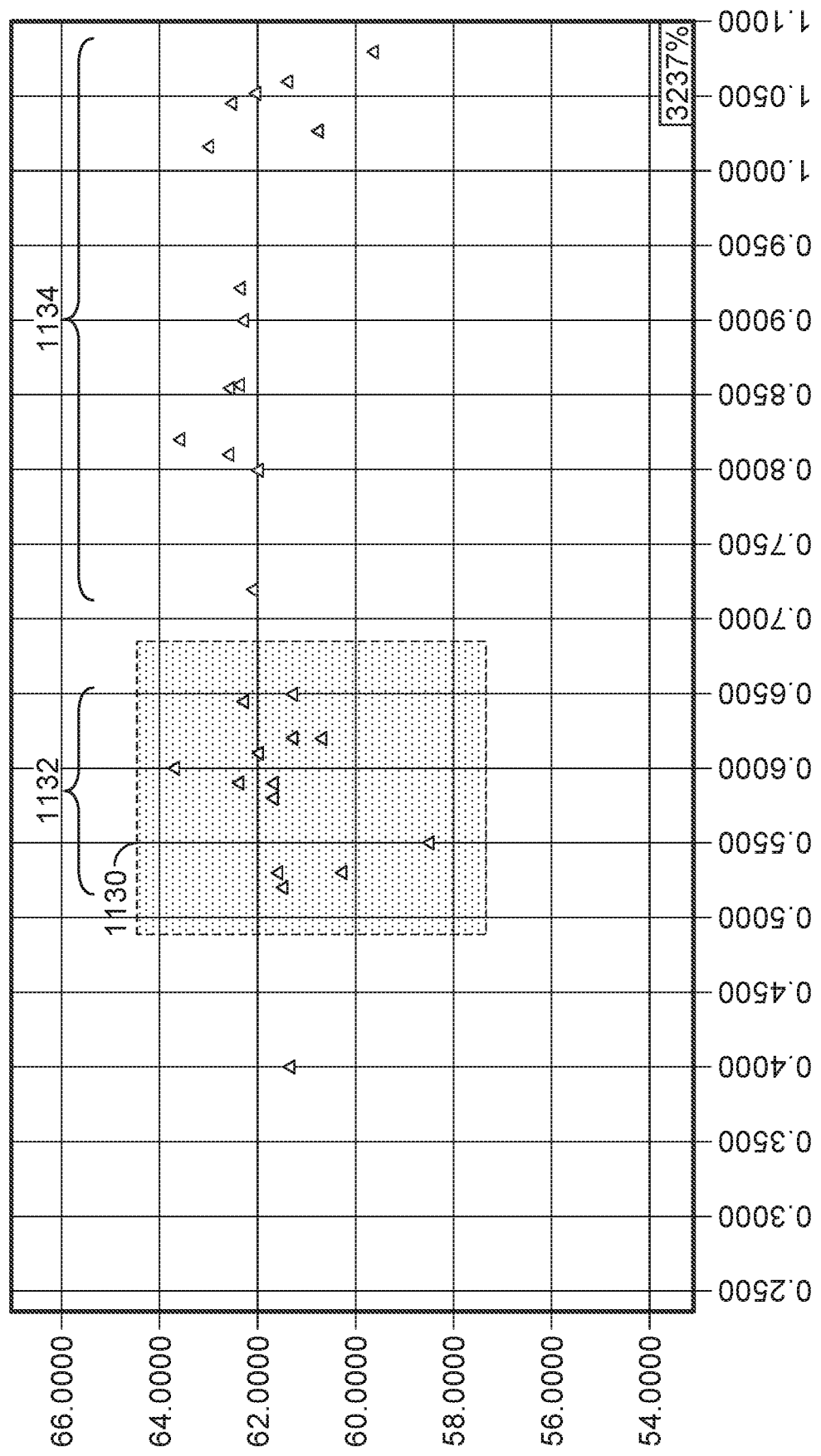

Turning now to FIG. 11B, an illustration of a visualization rendered using visualization image data based on received input data in accordance with an embodiment of the invention is shown. The visualization 1120 includes a first set of visualization data points 1132 (corresponding to the first set of visualization data points 1112 above) and a second set of visualization data points 1134 (corresponding to the second set of visualization data points 1114 above) within the displayed visualization 1120. Relative to the display of the first and second sets of visualization data points in FIG. 11A, the amount of detail and relative spacing between the visualization data points has increased due to the increased zoom level of the visualization 1120. In a variety of embodiments, the visualization 1120 includes visualization image data rendered based on the input data 1110 and the visualization data points included within the visualization. The visualization 1120 additionally includes input data 1130 indicating that the first set of visualization data points 1132 has been selected for additional exploration.

Figure 11C:
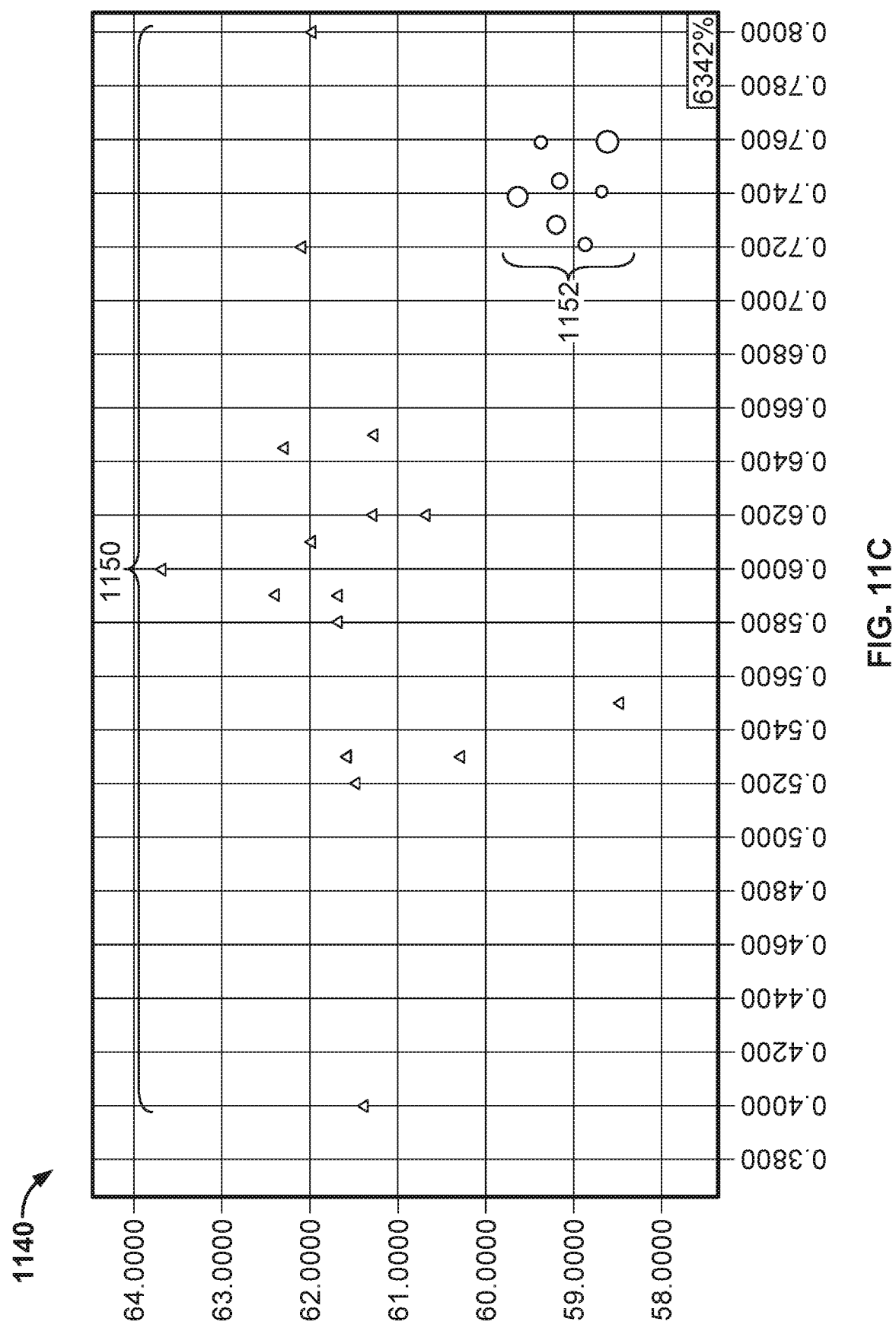

Turning now to FIG. 11C, an illustration of a visualization rendered using visualization image data based on received input data in accordance with an embodiment of the invention is shown. The visualization 1140 includes a plurality of visualization data points 1150 corresponding to the visualization data points 1112 and 1132. As compared to visualizations 1100 and 1120 above, the visualization data points 1150 are even further spaced apart and fewer in number based on the input data 1130. In many embodiments, the input data 1130 indicates a semantic zoom and additional visualization data points 1152 are included in visualization 1140. These visualization data points are incorporated into the visualization image data for the visualization 1140 based on the visualization rendering data and the received input data.

Although specific processes for displaying interactions with visualizations in accordance with embodiments of the invention are discussed above with respect to FIG. 10 and specific illustrations of an interaction with visualizations are shown in FIGS. 11A-11C, a variety of processes and interfaces (including those that display the current zoom factor) can be utilized in accordance with embodiments of the invention. Processes for trellised visualizations in accordance with embodiments of the invention are described below.

Trellised Visualizations

Figure 12:
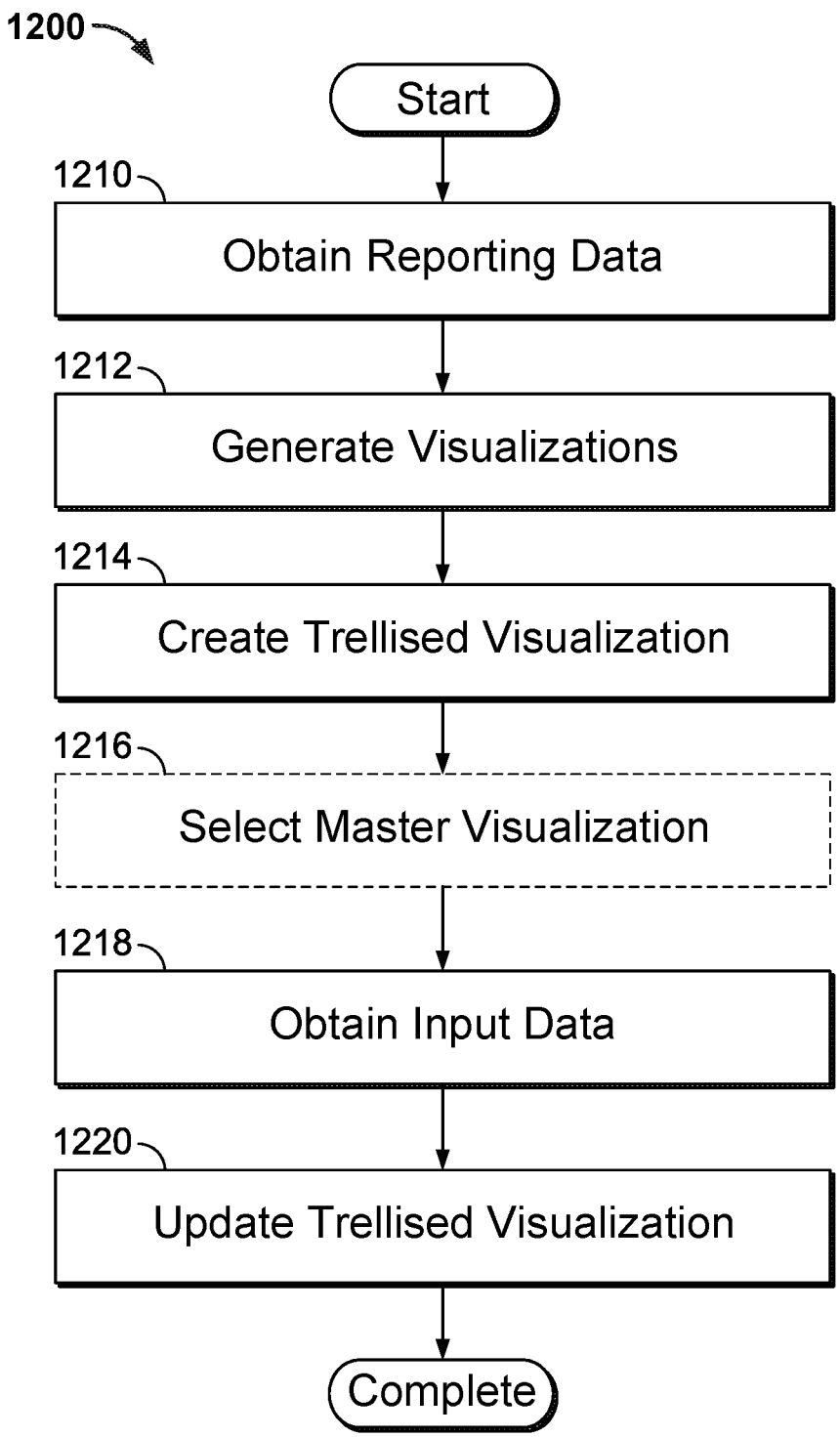
FIG. 12 is a flow chart illustrating a process for interacting with a trellised visualization in accordance with an embodiment of the invention.

Reporting data often contains multiple datasets; these datasets are commonly related across one or more dimensions. Similarly, multiple pieces of reporting data may be related and/or a comparative analysis of the reporting data is desired. By visualizing multiple datasets simultaneously, interesting and useful features within the reporting data can be visualized. Analysts can identify these features and target specific aspects of the reporting data for additional analysis. Interest-driven data visualization systems in accordance with embodiments of the invention are configured to generate and display trellised visualizations containing visualizations associated with one or more datasets. A process for creating and interacting with trellised visualizations in accordance with an embodiment of the invention is shown in FIG. 12. The process 1200 includes obtaining (1210) reporting data. Visualizations are generated (1212) and a trellised visualization is created (1214). In many embodiments, a master visualization is selected (1216). Input data is obtained (1218) and the trellised visualization is updated (1220).

In a variety of embodiments, reporting data is obtained (1210) utilizing techniques similar to those described above. The obtained (1210) reporting data includes one or more datasets. In several embodiments, visualizations are generated (1212) for one or more of the datasets included in the obtained (1210) reporting data using processes similar to those described above. In a number of embodiments, a trellised visualization is created (1214) using the generated (1212) visualizations. In many embodiments, selecting (1216) a master visualization includes identifying at least one of the generated (1212) visualizations within the created (1214) trellised visualization. It should be noted that the visualization selected (1216) as the master visualization can be modified during the exploration of the trellised visualization. In a variety of embodiments, input data is obtained (1218) with respect to one or more of the visualizations within the created (1214) trellised visualization (such as the selected (1216) master visualization) utilizing techniques similar to those described above. In a number of embodiments, a trellised visualization is updated (1220) by updating one or more of the generated (1212) visualizations based on the obtained (1218) input data. The visualizations can be updated independently of each other as appropriate to the requirements of specific applications in accordance with embodiments of the invention. For example, the selected (1216) master visualization can be zoomed in while a separate visualization in the trellised visualization remains at a given zoom level, thereby providing a user with both a high level view of the data and a more detailed view the data. Similarly, multiple visualizations within the trellised visualization can be manipulated in the same manner based on the obtained (1218) input data to provide similar explorations into a variety of datasets within the obtained (1210) reporting data simultaneously. Techniques for establishing relationships between visualizations and exploring those visualizations in accordance with embodiments of the invention are discussed in more detail below. Other techniques for updating (1220) trellised visualizations can be performed as appropriate to the requirements of specific applications in accordance with embodiments of the invention. In particular, the obtained (1218) input data can include interactions with a particular set of dimensions and/or facts contained within the reporting data. In this way, some or all of the visualizations that include a subset of the facts and/or dimensions can be updated (1220) based on the input data as applied to the facts and/or dimensions contained within the visualization.

Figure 13:
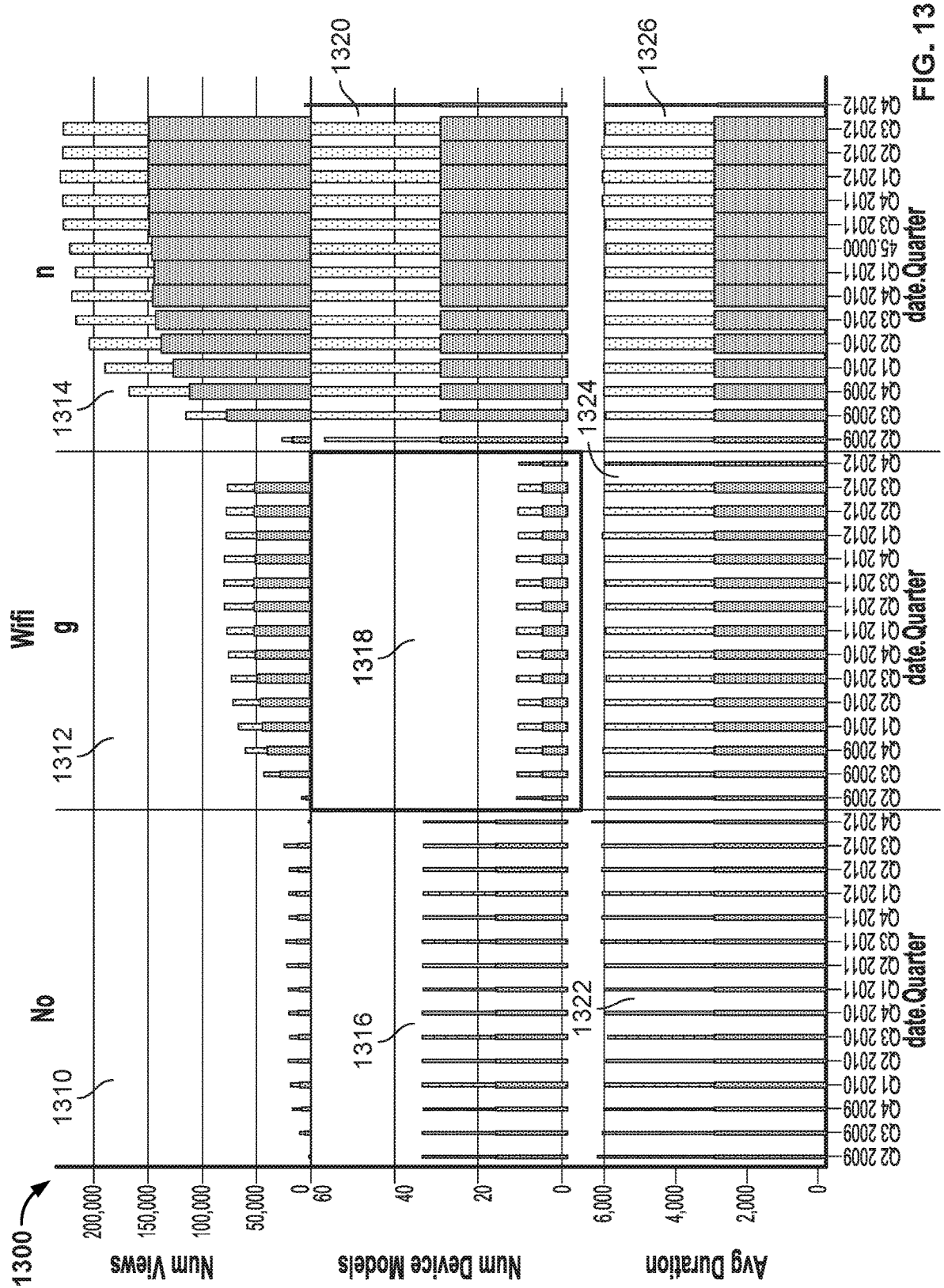
FIG. 13 is an illustration of the visual appearance of a trellised visualization in accordance with an embodiment of the invention.

Turning now to FIG. 13, an illustration of a trellised visualization in accordance with an embodiment of the invention is shown. The trellised visualization 1300 includes visualizations 1310, 1312, 1314, 1316, 1318, 1320, 1322, 1324, and 1326. Each of the visualizations 1310-1326 displays facts within the datasets included in the reporting data associated with the trellised visualization 1300 utilizing column charts. In the illustrated embodiment, visualization 1318 has been highlighted (as visualized by the highlighting box within visualization 1318) to indicate that visualization 1318 is the master visualization within the trellised visualization 1300. Accordingly, as input data is received to facilitate the exploration of the trellised visualization 1300, the input data will be received with respect to master visualization 1318 and the slave visualizations (that is, visualizations 1310, 1312, 1314, 1316, 1320, 1322, 1324, and 1326) will be updated according to the exploration of master visualization 1318. Similarly, each of the visualizations can be manipulated independently as appropriate to the requirements of specific applications in accordance with embodiments of the invention.

Processes for trellised visualizations in accordance with embodiments of the invention are discussed above with respect to FIG. 12 and a specific illustration of a trellised visualization is illustrated in FIG. 13. However, a variety of processes, including those that contain visualizations based on datasets from multiple pieces of reporting data, and any trellised visualizations can be utilized in accordance with embodiments of the invention. Relationships between visualizations in trellised visualizations are described below.

Trellised Visualizations with Multiple Master Visualizations

Figure 14:
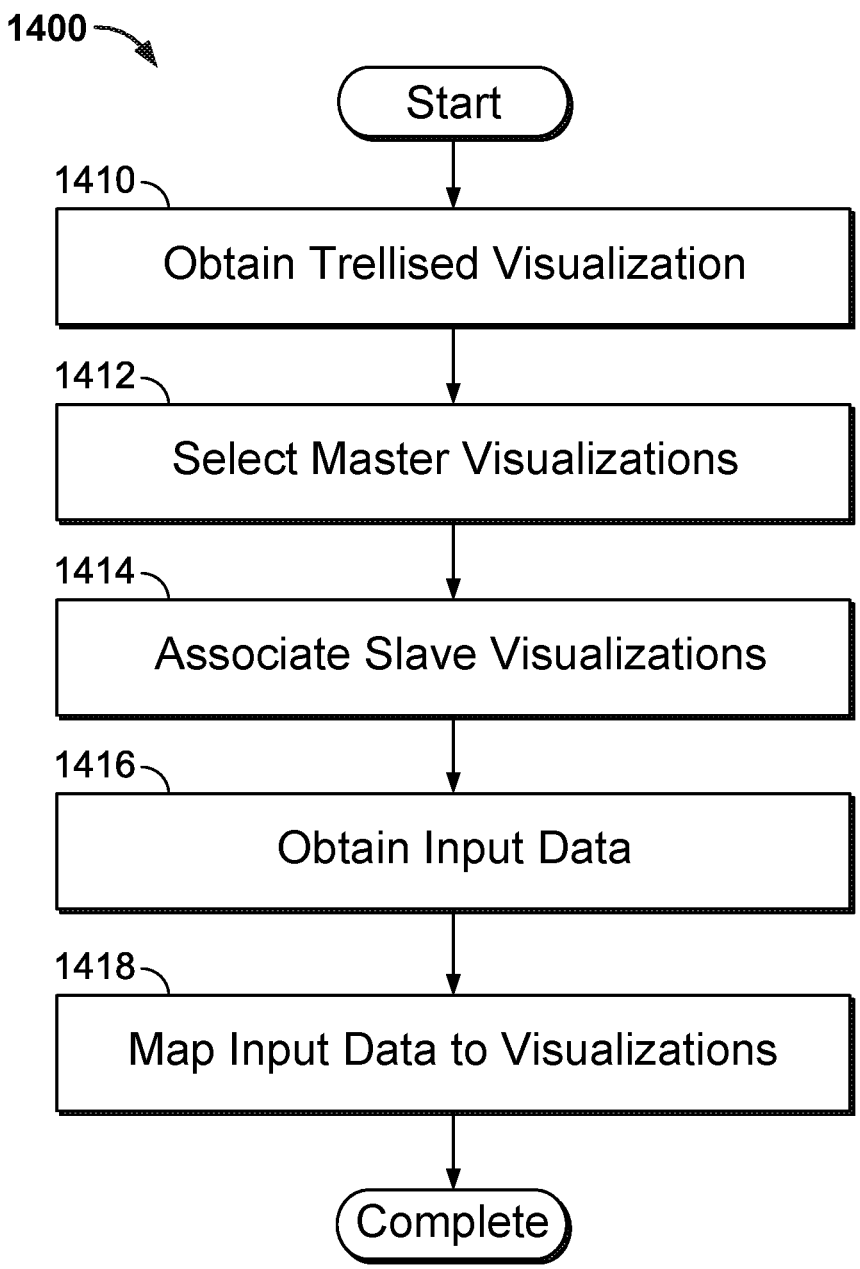
FIG. 14 is a flow chart illustrating a process for interacting with a trellised visualization having multiple master visualizations in accordance with an embodiment of the invention.

Trellised visualizations provide a powerful interface for exploring multiple datasets within one or more pieces of reporting data. By having multiple master visualizations within a trellised visualization, a variety of different views of the data can be compared and explored simultaneously. Similarly, different views of the same pieces of data can be explored within the trellised visualization. Interest-driven data visualization systems in accordance with embodiments of the invention are configured to generate and display trellised visualizations including multiple master visualizations. A process for exploring trellised visualizations with multiple master visualizations in accordance with an embodiment of the invention is shown in FIG. 14. The process 1400 includes obtaining (1410) a trellised visualization, selecting (1412) master visualizations, and associating (1414) slave visualizations. Input data is obtained (1416) and input data is mapped to visualizations (1418).

In many embodiments, a trellised visualization is obtained (1410) utilizing processes similar to those described above. In several embodiments, one or more of the visualizations within the obtained (1410) trellised visualization are identified (1412) as master visualizations. One or more visualizations within the obtained (1410) trellised visualization are associated (1414) with each of the identified (1412) master visualizations. In a variety of embodiments, the associated (1414) visualizations are referred to as slave visualizations with respect to the identified (1412) master visualization(s). In several embodiments, input data is obtained (1416) with respect to one or more of the identified (1412) master visualizations utilizing techniques similar to those described above. In many embodiments, the input data is mapped (1418) to the slave visualizations associated (1414) master visualization(s). The master visualization(s) and the associated slave visualizations are updated based on the mapped (1418) input data utilizing processes similar to those described above. In a number of embodiments, a visualization is associated with both a master visualization and a slave visualization. That is, a single visualization can be both identified (1412) as a master visualization and associated (1414) as a slave visualization with a separate master visualization. In this way, a hierarchical relationship between visualizations can be created within the trellised visualization. In certain embodiments, cycle identification techniques, such as edge marking, are utilized to identify and/or prevent cyclical relationships between the visualizations. It should be noted, however, that any relationships, not just hierarchical relations, can be established between the visualizations as appropriate to the requirements of specific applications in accordance with embodiments of the invention.

Figure 15:
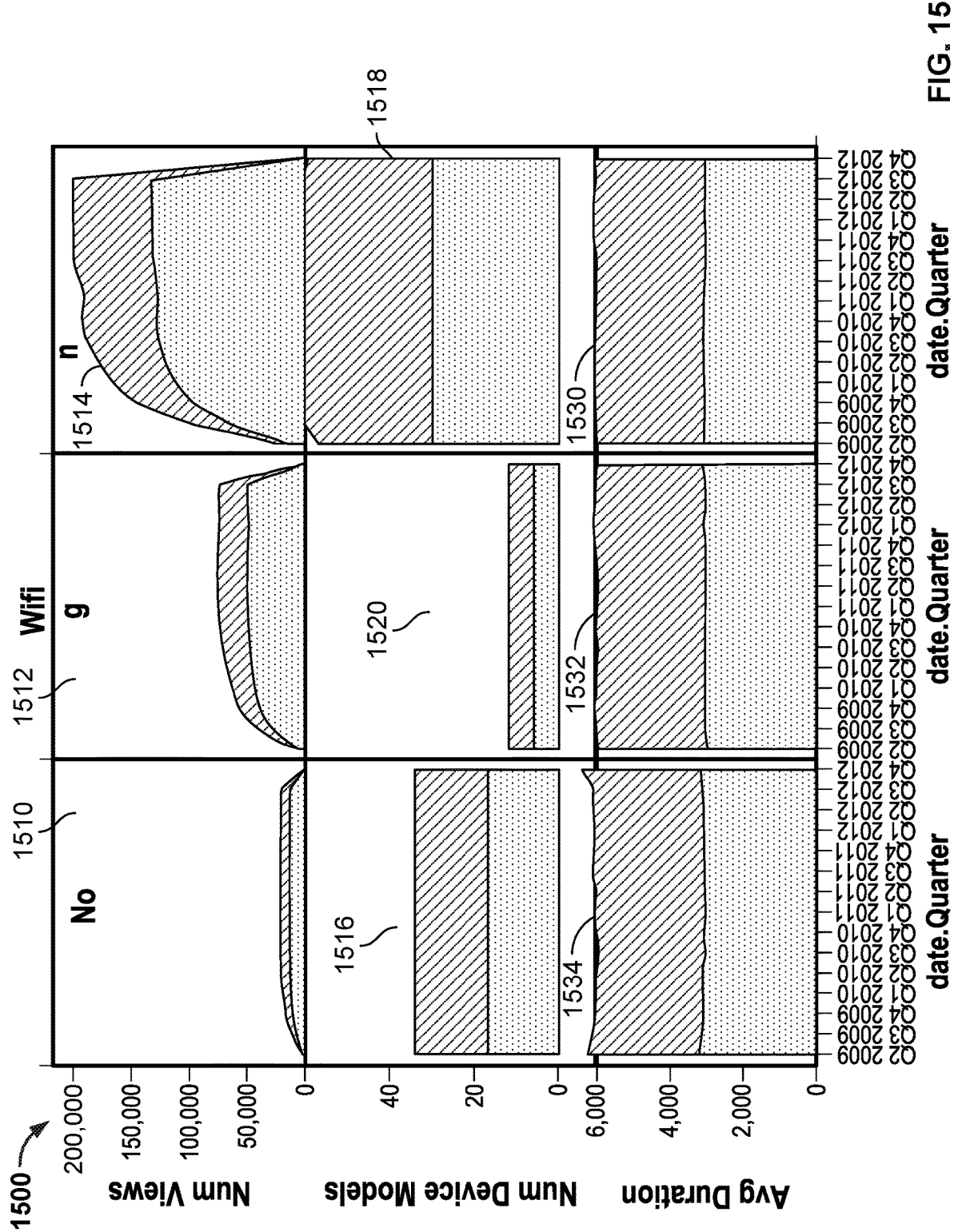
FIG. 15 is an illustration of the visual appearance of a trellised visualization having multiple master visualizations in accordance with an embodiment of the invention.

Turning now to FIG. 15, an illustration of a trellised visualization with multiple master visualizations in accordance with an embodiment of the invention is shown. The trellised visualization 1500 includes master visualizations 1510, 1520, and 1530 along with slave visualizations 1512, 1514, 1516, 1518, 1532, and 1534. Slave visualizations 1512, 1514, 1516, and 1518 are associated with master visualization 1510, while slave visualizations 1532 and 1534 are associated with master visualization 1530. Master visualization 1520 is not associated with any slave visualizations. In the exploration of the trellised visualization 1500, input data provided with respect to master visualization 1510 will be mapped to slave visualizations 1512, 1514, 1516, and 1518. Each of slave visualization 1512, 1514, 1516, and 1518 will be updated based on the input data. However, as described above, the updates to each of the slave visualizations need not be the same as the master visualization 1510 or as each other. While each visualization can be updated in the same (or a similar) manner based on the input data, each visualization can be updated based on the input data in an independent fashion from the other visualizations within the trellised visualization as described above. Similarly, input data received with respect to master visualization 1530 is mapped to slave visualizations 1532 and 1534. Input data received with respect to master visualization 1520 is not mapped to any other visualizations within the trellised visualization 1500.

By way of another example, assume that master visualizations 1510 and 1530 are associated with master visualization 1520, while the relationships between master visualizations 1510 and 1530 remain the same as before. That is, master visualizations 1510 and 1530 are slave visualizations with respect to master visualization 1520. Input data associated with master visualizations 1510 and 1530 will map to the slave visualizations as described above. However, input data associated with master visualization 1520 will now be mapped to master visualizations 1510 and 1530. By extension, the input data associated with master visualization 1520 will also be mapped to the slave visualizations. In this way, input data associated with master visualization now causes each visualization within the trellised visualization 1500 to update in response to the input data.

Processes for trellised visualizations in accordance with embodiments of the invention are discussed above with respect to FIG. 14 and a specific illustration of a trellised visualization with multiple master visualizations is conceptually illustrated in FIG. 15. However, any of a variety of processes, including those that obtain input data for multiple master visualizations in parallel, and any trellised visualization can be utilized in accordance with embodiments of the invention. Techniques for manipulating trellised visualizations in accordance with embodiments of the invention are described below.

Manipulating Trellised Visualizations

Figure 16:
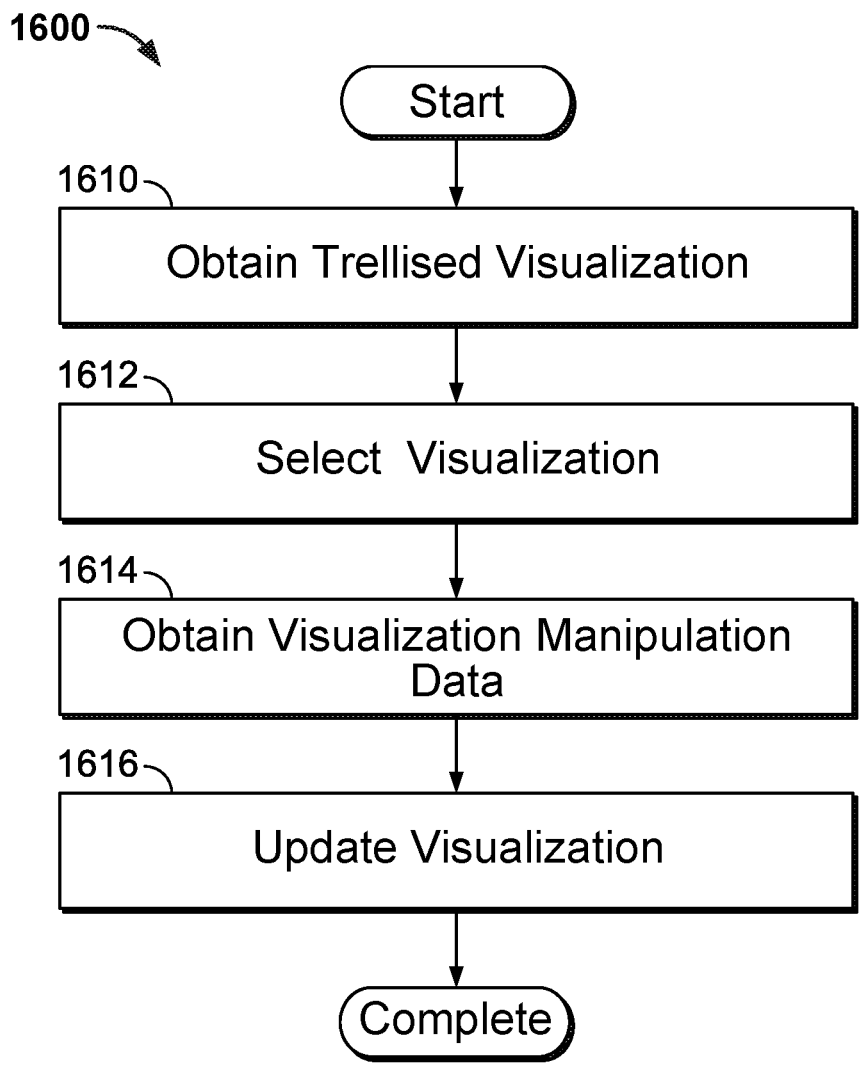
FIG. 16 is a flow chart illustrating a process for manipulating trellised visualizations in accordance with an embodiment of the invention.

Within a trellised visualization, it is possible to manipulate each visualization individually. In this way, a variety of different views of the data can be combined to provide a rich interface for the exploration of data. A process for manipulating trellised visualizations in accordance with an embodiment of the invention is shown in FIG. 16. The process 1600 includes obtaining (1610) a trellised visualization. A visualization is selected (1612), visualization manipulation data is obtained (1614), and a visualization is updated (1616).

In a variety of embodiments, a trellised visualization is obtained (1610) utilizing processes similar to those described above. In several embodiments, the selected (1612) visualization is one or more of the visualizations in the obtained (1610) trellised visualization. In a number of embodiments, the selected (1612) visualization is not present within the obtained (1610) trellised visualization. The obtained (1614) visualization manipulation data contains instructions for manipulating visualizations. The selected (1612) visualization(s) can be manipulated in a variety of ways, including changing the visual properties of the visualization(s), changing the range of data visible within the visualization(s), altering the layout of the visualizations within the trellised visualization, associating the selected (1612) visualizations with the trellised visualization, disassociating the selected (1612) visualizations from the trellised visualization, or any other manipulation as appropriate to the requirements of specific applications in accordance with embodiments of the invention. In many embodiments, the obtained (1614) visualization manipulation data includes instructions for modifying the dataset within the reporting data associated with the visualization. In a variety of embodiments, the obtained (1614) visualization manipulation data includes metadata identifying a piece of reporting data not already included within the trellised visualization to be associated with the visualization. In this way, reporting data can be added or removed to a trellised visualization. The visualizations are updated (1616) based on the obtained (1614) visualization manipulation data utilizing processes similar to those described above.

Processes for manipulating trellised visualizations in accordance with embodiments of the invention are discussed above with respect to FIG. 16; however, a variety of processes, including those that include other manipulations of visualizations within a trellised visualization not specifically described above, can be utilized in accordance with embodiments of the invention. Additionally, any of the various processes described above can be performed in alternative sequences and/or in parallel (on different computing devices) in order to achieve similar results in a manner that is more appropriate to the requirements of a specific application.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. An interest-driven data visualization system, comprising:
    a processor; and
    a memory connected to the processor and configured to store an interest-driven data visualization application;
    wherein the interest-driven data visualization application configures the processor to:
        obtain reporting data from an interest-driven business intelligence server system, the reporting data including a plurality of datasets;
        generate visualization rendering data for the plurality of datasets based on associations between visualization metadata and the plurality of datasets;
        generate visualization image data based on the visualization rendering data and the plurality of datasets, where the visualization image data is configured to be displayed using a display device and comprises visual representations of at least a portion of the reporting data, at least one piece of visualization image data corresponding to a master visualization, at least another piece of visualization image data corresponding to a slave visualization, and wherein the slave visualization has a relationship with the master visualization such that each piece of input data associated with the master visualization is mapped to the slave visualization and such that at least one piece of the input data associated with the slave visualization is not mapped to the master visualization;
        obtain the generated image visualization metadata from an interest-driven business intelligence server system;
        receive aggregate data metadata from the interest-driven business intelligence server system, wherein the aggregate data metadata includes time estimation data describing a delay associated with generating supplemental aggregate data using source data generated based on time taken to generate at least a portion of aggregated data corresponding to the reporting data;
        generate supplemental data retrieval job data based on data retrieval job data and received aggregate data;
        transmit the supplemental data retrieval job data to the interest-driven business intelligence server system;
        receive supplemental aggregate data from the interest-driven business intelligence server system;
        update at least one piece of the reporting data using the supplemental aggregate data, data description metadata, and reporting data metadata; and
        generate updated visualization image data based on the updated reporting data.

2. The system of claim 1, wherein:
    the interest-driven data visualization system further comprises a display device connected to the processor; and
    the interest-driven data visualization application further configures the processor to display the generated visualization image data using the display device.

3. The system of claim 1, wherein the interest-driven data visualization application further configures the processor to generate visualization image data by:
    associating the visualization metadata with the reporting data, where the visualization metadata describes at least one graphical primitive associated with at least one piece of reporting data; and wherein the processor displays the generated visualization image data by:
    rendering the visualization image data using the visualization rendering data and the reporting data.

4. The system of claim 3, wherein the interest-driven data visualization further comprises an input device connected to the processor and configured to obtain the input data; and the master visualization is identified by the input data.

5. The system of claim 4, wherein the each piece of input data associated with the master visualization and such the at least one piece of the input data associated with the slave visualization are obtained by the input device.

6. The system of claim 1, wherein the interest-driven data visualization application configures the processor to:
    generate a report of at least a portion of the reporting data;

capture a visualization snapshot using the report, where the visualization snapshot includes the portion of the reporting data, reporting data requirements, and display data metadata; and store the visualization snapshot within the memory.

7. The system of claim 6, wherein the interest-driven data visualization application further configures the processor to transmit the visualization snapshot to a remote system separate from the interest-driven data visualization system, where the remote system is configured to display the visualization snapshot without communicating with the interest-driven business intelligence server system.

8. The system of claim 1, wherein the interest-driven data visualization application further configures the processor to create a trellised visualization utilizing the visualization image data for each of the datasets.

9. The system of claim 1, wherein the interest-driven data visualization application further configures the processor to:
obtain the input data, the input data describing an interaction with the master visualization;
render updated master visualization image data for the master visualization based on the input data, the updated master visualization image data corresponding to the master visualization;
map the input data to the slave visualization; and
render updated slave visualization image data for the slave visualization.

10. The system of claim 1, further comprising an input device connected to the processor and configured to obtain input data and wherein the interest-driven data visualization application further configures the processor to identify a master visualization and a slave visualization using the input data.

11. The system of claim 1, further comprising a display device connected to the processor.

12. The system of claim 11, wherein the interest-driven data visualization application further configures the processor to display the generated visualization image data using the display device.

13. A method for visualizing reporting data, comprising:
obtaining reporting data from an interest-driven business intelligence server system, the reporting data including a plurality of datasets;
generating, using a processor, visualization rendering data for the plurality of datasets based on associations between visualization metadata and the plurality of datasets;
generating visualization image data based on the visualization rendering data and the plurality of datasets, where the visualization image data is configured to be displayed using a display device and comprises visual representations of at least a portion of the reporting data, at least one piece of visualization image data corresponding to a master visualization, at least another piece of visualization image data corresponding to a slave visualization, and wherein the slave visualization has a relationship with the master visualization such that each piece of input data associated with the master visualization is mapped to the slave visualization and such that at least one piece of the input data associated with the slave visualization is not mapped to the master visualization;
obtaining the generated image visualization metadata from an interest-driven business intelligence server system;
receiving aggregate data metadata from the interest-driven business intelligence server system, wherein the aggregate data metadata includes time estimation data describing a delay associated with generating supplemental aggregate data using source data generated based on time taken to generate at least a portion of aggregated data corresponding to the reporting data;
generating supplemental data retrieval job data based on data retrieval job data and received aggregate data;
transmitting the supplemental data retrieval job data to the interest-driven business intelligence server system;
receiving supplemental aggregate data from the interest-driven business intelligence server system;
updating at least one piece of the reporting data using the supplemental aggregate data, data description metadata, and reporting data metadata; and
generating updated visualization image data based on the updated reporting data.

14. A computer program product for visualizing reporting data, the computer program product being embodied in a non-transitory computer readable storage medium and comprising computer instructions for:
obtaining reporting data from an interest-driven business intelligence server system, the reporting data including a plurality of datasets;
generating, using a processor, visualization rendering data for the plurality of datasets based on associations between visualization metadata and the plurality of datasets;
generating visualization image data based on the visualization rendering data and the plurality of datasets, where the visualization image data is configured to be displayed using a display device and comprises visual representations of at least a portion of the reporting data, at least one piece of visualization image data corresponding to a master visualization, at least another piece of visualization image data corresponding to a slave visualization, and wherein the slave visualization has a relationship with the master visualization such that each piece of input data associated with the master visualization is mapped to the slave visualization and such that at least one piece of the input data associated with the slave visualization is not mapped to the master visualization;
obtaining the generated image visualization metadata from an interest-driven business intelligence server system;
receiving aggregate data metadata from the interest-driven business intelligence server system, wherein the aggregate data metadata includes time estimation data describing a delay associated with generating supplemental aggregate data using source data generated based on time taken to generate at least a portion of aggregated data corresponding to the reporting data;
generating supplemental data retrieval job data based on data retrieval job data and received aggregate data;
transmitting the supplemental data retrieval job data to the interest-driven business intelligence server system;
receiving supplemental aggregate data from the interest-driven business intelligence server system;
updating at least one piece of the reporting data using the supplemental aggregate data, data description metadata, and reporting data metadata; and
generating updated visualization image data based on the updated reporting data.

* * * * *